United States Patent
Morisaki

(10) Patent No.: US 10,375,328 B2
(45) Date of Patent: Aug. 6, 2019

(54) IMAGE SENSOR, METHOD OF READING CONTROL, AND ELECTRONIC DEVICE

(71) Applicant: SONY CORPORATION, Tokyo (JP)

(72) Inventor: Akio Morisaki, Fukuoka (JP)

(73) Assignee: Sony Corporation, Tokyo (JP)

( * ) Notice: Subject to any disclaimer, the term of this patent is extended or adjusted under 35 U.S.C. 154(b) by 3 days.

(21) Appl. No.: 15/548,856

(22) PCT Filed: Jan. 29, 2016

(86) PCT No.: PCT/JP2016/052590
§ 371 (c)(1),
(2) Date: Aug. 4, 2017

(87) PCT Pub. No.: WO2016/129408
PCT Pub. Date: Aug. 18, 2016

(65) Prior Publication Data
US 2018/0027192 A1    Jan. 25, 2018

(30) Foreign Application Priority Data

Feb. 13, 2015    (JP) .................................. 2015-026495

(51) Int. Cl.
*H04N 3/14*    (2006.01)
*H04N 5/335*    (2011.01)
(Continued)

(52) U.S. Cl.
CPC ............. *H04N 5/347* (2013.01); *H04N 5/378* (2013.01); *H04N 5/3765* (2013.01);
(Continued)

(58) Field of Classification Search
CPC .. H04N 5/347; H04N 5/3745; H04N 5/37452; H04N 5/378; H04N 5/363; H01L 27/14605; H01L 27/14636
See application file for complete search history.

(56) References Cited

U.S. PATENT DOCUMENTS

| 9,185,369 B2* | 11/2015 | Abe ..................... H04N 3/155 |
| 2005/0062864 A1* | 3/2005 | Mabuchi ............... H04N 3/155 348/294 |

(Continued)

FOREIGN PATENT DOCUMENTS

| JP | 2006-80937 A | 3/2006 |
| JP | 2012-253624 A | 12/2012 |

(Continued)

OTHER PUBLICATIONS

International Search Report prepared by the Japan Patent Office dated Mar. 14, 2016, for International Application No. PCT/JP2016/052590.

*Primary Examiner* — Kelly L Jerabek
(74) *Attorney, Agent, or Firm* — Sheridan Ross P.C.

(57) ABSTRACT

The present technology relates to an image sensor capable of improving a reading speed of signals of a plurality of same-color pixels that shares floating diffusion (FD), a method of reading control, and an electronic device. After resetting the FD, the image sensor transfers to the FD an electric charge of a first pixel. The image sensor then transfers an electric charge of a second pixel to the FD. In addition, the image sensor performs A/D conversion of a signal level of the first pixel by an A/D converter in accordance with a clock signal of a first frequency, and performs A/D conversion of a signal level of the second pixel by the A/D converter in accordance with a clock signal of a second frequency obtained by dividing the first frequency by a predetermined division ratio. The present technology is applicable to CMOS image sensors.

8 Claims, 13 Drawing Sheets

(51) Int. Cl.
  *H04N 5/347* (2011.01)
  *H04N 5/378* (2011.01)
  *H04N 5/3745* (2011.01)
  *H04N 5/376* (2011.01)
  *H04N 9/04* (2006.01)

(52) U.S. Cl.
  CPC ..... *H04N 5/37455* (2013.01); *H04N 5/37457* (2013.01); *H04N 9/045* (2013.01)

(56) References Cited

U.S. PATENT DOCUMENTS

| | | | |
|---|---|---|---|
| 2006/0274207 A1* | 12/2006 | Hayden | G09G 5/008 348/572 |
| 2011/0248145 A1* | 10/2011 | Tanaka | H03M 1/144 250/208.1 |
| 2012/0307120 A1 | 12/2012 | Ito et al. | |
| 2013/0057744 A1 | 3/2013 | Minagawa et al. | |
| 2014/0022401 A1* | 1/2014 | Awatani | H04N 5/335 348/207.11 |
| 2015/0060644 A1* | 3/2015 | Fukuhara | H04N 5/378 250/208.1 |
| 2015/0070544 A1* | 3/2015 | Smith | H01L 27/14641 348/297 |

FOREIGN PATENT DOCUMENTS

| | | |
|---|---|---|
| JP | 2013-55500 A | 3/2013 |
| JP | 2013-070240 | 4/2013 |
| WO | WO 2012/144215 A1 | 10/2012 |

* cited by examiner

IMAGE SENSOR, METHOD OF READING CONTROL, AND ELECTRONIC DEVICE

CROSS REFERENCE TO RELATED APPLICATIONS

This application is a national stage application under 35 U.S.C. 371 and claims the benefit of PCT Application No. PCT/JP2016/052590 having an international filing date of 29 Jan. 2016, which designated the United States, which PCT application claimed the benefit of Japanese Patent Application No. 2015-026495 filed 13 Feb. 2015, the disclosures of which are incorporated herein by reference in their entirety.

TECHNICAL FIELD

The present technology relates to an image sensor, a method of reading control, and an electronic device, and relates to an image sensor capable of improving a reading speed of signals of a plurality of same-color pixels that shares floating diffusion (FD), a method of reading control, and an electronic device.

BACKGROUND ART

Examples of a method of pixel addition in a complementary metal oxide semiconductor (CMOS) image sensor include a comparator capacitance addition method and a counter addition method.

The comparator capacitance addition method is a method by which a plurality of capacitances is provided in parallel on an input side of a comparator of a column ADC, and signals from a plurality of vertical signal lines are added in the capacitances. The counter method is a method by which digital addition is performed in a counter circuit within the column A/D converter (ADC).

The comparator capacitance addition method is described, for example, in Patent Document 1. An image sensor described in Patent Document 1 is configured such that two vertical signal lines are provided in each column, and weighted addition of outputs of two pixels is performed in the input capacitances of the comparator.

In addition, the counter addition method is described, for example, in Patent Document 2. An image sensor described in Patent Document 2 is configured to perform digital addition by performing A/D conversion on each output of two pixels with resolution or gain changed.

CITATION LIST

Patent Document

Patent Document 1: Japanese Patent Application Laid-Open No. 2012-253624
Patent Document 2: Japanese Patent Application Laid-Open No. 2013-070240

SUMMARY OF THE INVENTION

Problems to be Solved by the Invention

For example, the technology described in Patent Document 2 needs to use two vertical signal lines for one reading of signals of two pixels to be added. Therefore, a frame rate cannot be improved when compared with a method without addition that uses one vertical signal line for one reading and performs north and south (upper and lower) simultaneous reading. In order to improve the frame rate, a method of increasing the number of vertical signal lines per column and performing north and south simultaneous reading can also be considered, but this method is not effective from a viewpoint of a circuit area and power consumption.

The present technology has been made in view of such circumstances, and aims at enabling improvement in a reading speed of signals of a plurality of same-color pixels that shares FD.

Solutions to Problems

An image sensor according to one aspect of the present technology includes: a pixel array unit in which same-color pixels that share FD are connected to an identical first vertical signal line; a reading control unit configured to control reading of an electric charge from a plurality of pixels that shares the FD so as to transfer, after resetting the FD, to the FD an electric charge of a first pixel of the pixels that share the FD, and after transferring the electric charge of the first pixel to the FD, to transfer an electric charge of a second pixel to the FD; and a first A/D converter connected to the first vertical signal line, the first A/D converter being configured to perform A/D conversion of a signal level of the first pixel in accordance with a clock signal of a first frequency, and to perform A/D conversion of a signal level of the second pixel in accordance with a clock signal of a second frequency obtained by dividing the first frequency by a predetermined division ratio.

Before the electric charge is transferred from the first pixel, the first A/D converter can perform A/D conversion of a reset level to be used for CDS in accordance with the clock signal of the first frequency and in accordance with the clock signal of the second frequency.

The pixel array unit can be provided with a third pixel of predetermined color different from color of the first pixel, the third pixel being adjacent to the first pixel, and a fourth pixel of the predetermined color, the fourth pixel being adjacent to the second pixel. In this case, the third pixel and the fourth pixel that share the FD are connected to a second vertical signal line provided in a first column identical to the first vertical signal line to which the first pixel and the second pixel are connected.

After resetting the FD, the reading control unit can transfer an electric charge of the third pixel to the FD, and after transferring the electric charge of the third pixel to the FD, the reading control unit can transfer an electric charge of the fourth pixel to the FD. In this case, the image sensor can further include a second A/D converter connected to the second vertical signal line, the second A/D converter being configured to perform A/D conversion of a signal level of the third pixel in accordance with the clock signal of the first frequency, and to perform A/D conversion of a signal level of the fourth pixel in accordance with the clock signal of the second frequency.

The first A/D converter and the second A/D converter can be provided at a first position and a second position that sandwich the pixel array unit, respectively.

A plurality of capacitances including a first capacitance and a second capacitance can be provided on an input side of the first A/D converter, the first capacitance accumulating an electric charge corresponding to electric signals read from the first pixel and the second pixel, the electric signals being supplied through the first vertical signal line, the second capacitance accumulating an electric charge corresponding to electric signals read from the first pixel and the second pixel of a second column, the electric signals being supplied through the first vertical signal line of the second column. In this case, the first A/D converter can perform A/D conversion of signals that are input through the capacitances.

In one aspect of the present technology, after resetting FD provided in a pixel array unit in which same-color pixels that share the FD are connected to an identical first vertical signal line, an electric charge of a first pixel of the plurality of pixels that share the FD is transferred to the FD, and after the electric charge of the first pixel is transferred to the FD, an electric charge of a second pixel is transferred to the FD. In addition, a first A/D converter connected to the first vertical signal line can perform A/D conversion of a signal level of the first pixel in accordance with a clock signal of a first frequency, and the first A/D converter can perform A/D conversion of a signal level of the second pixel in accordance with a clock signal of a second frequency obtained by dividing the first frequency by a predetermined division ratio.

Effects of the Invention

The present technology allows improvement in a reading speed of the signals of the plurality of same-color pixels that shares the FD.

Note that effects described here are not necessarily restrictive, and the present technology may achieve any effect described in the present disclosure.

MODE FOR CARRYING OUT THE INVENTION

Figure 1:
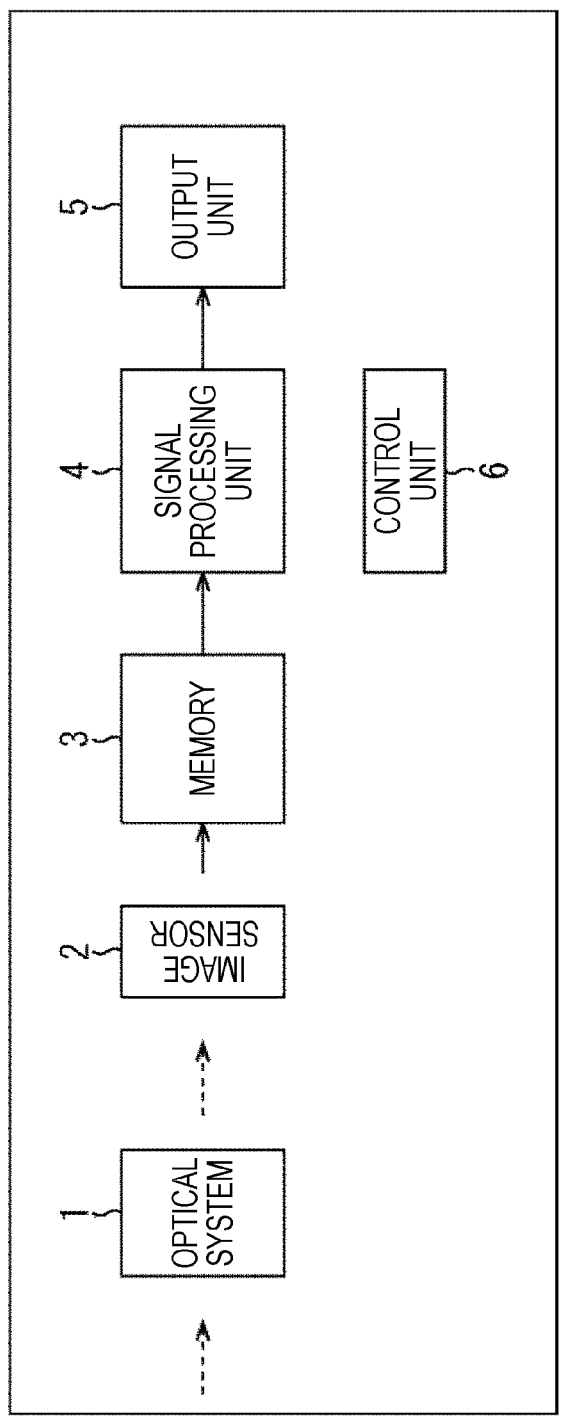
FIG. 1 is a block diagram illustrating an exemplary configuration of a digital camera to which the present technology is applied.

An embodiment of the present technology will be described below. The description will be provided in the following order:

1. Configuration of digital camera
2. Exemplary configuration of image sensor 2
3. Exemplary configuration of pixel access unit 11
4. Exemplary circuit configuration of pixel unit
5. Reading operation of pixel unit
6. About other reading operations
7. About effects
8. Variations <1. Configuration of Digital Camera>

FIG. 1 is a block diagram illustrating an exemplary configuration of a digital camera to which the present technology is applied.

The digital camera of FIG. 1 includes an optical system 1, an image sensor 2, a memory 3, a signal processing unit 4, an output unit 5, and a control unit 6.

The optical system 1 includes, for example, a zoom lens, a focus lens, a diaphragm, and the like. The optical system 1 lets light from outside enter the image sensor 2.

The image sensor 2 is a complementary metal oxide semiconductor (CMOS) image sensor. The image sensor 2 performs photoelectric conversion on the incident light from the optical system 1 and outputs image data.

The memory 3 temporarily accumulates the image data the image sensor 2 outputs.

The signal processing unit 4 performs signal processing, such as elimination of noise and adjustment of white balance, on the image data stored in the memory 3. The signal processing unit 4 outputs, to the output unit 5, the image data obtained by performing the signal processing.

The output unit 5 outputs the image data from the signal processing unit 4. For example, the output unit 5 has a display, such as an LCD, and displays images corresponding to the image data from the signal processing unit 4. In addition, the output unit 5 has a driver that drives a recording medium, such as a semiconductor memory, and records the image data from the signal processing unit 4 on the recording medium.

The control unit 6 controls each block that constitutes the digital camera in response to a user operation or the like.

Note that the digital camera of FIG. 1 can capture both images of static images and moving images.

<2. Exemplary Configuration of Image Sensor 2>

Figure 2:
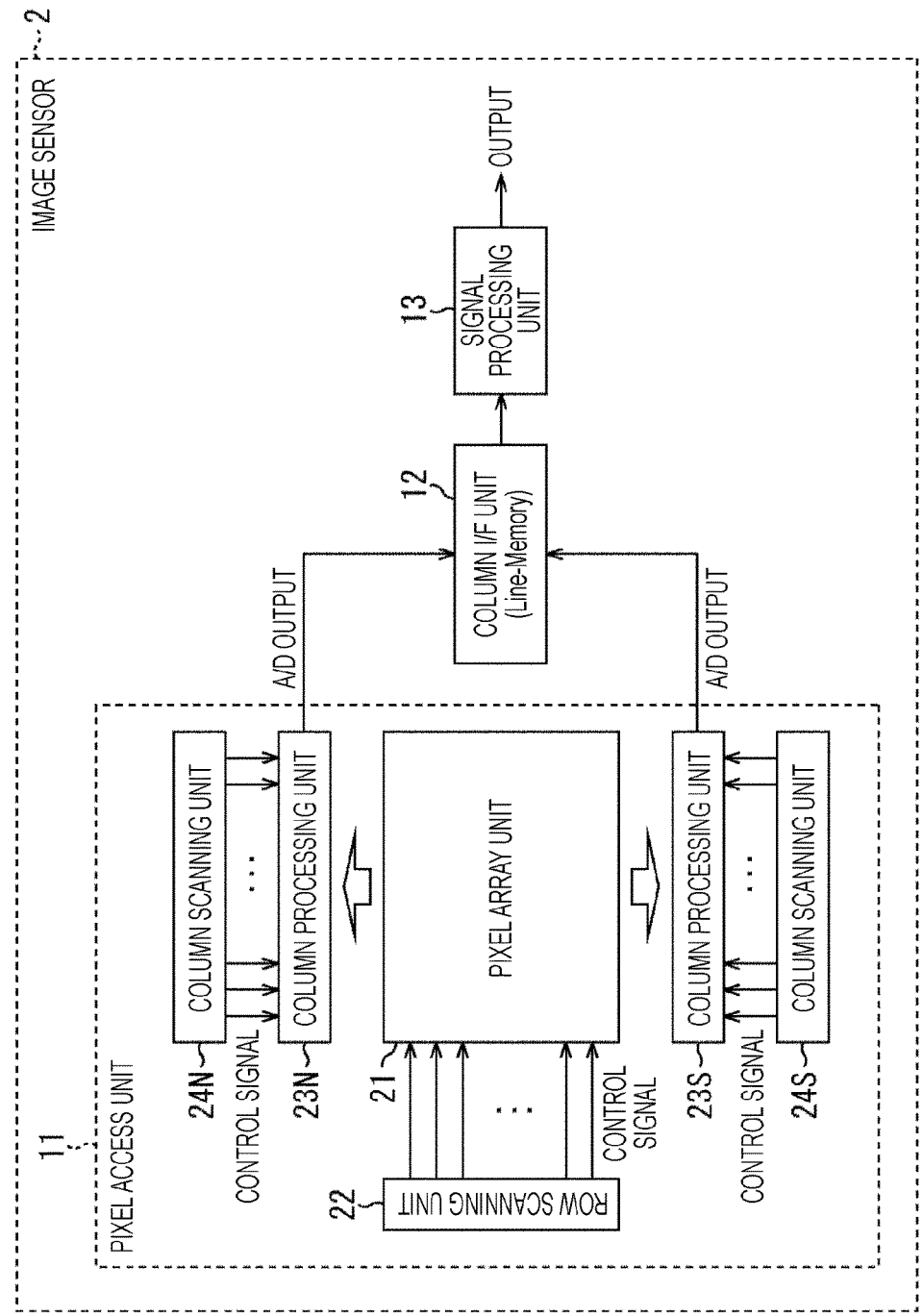
FIG. 2 is a block diagram illustrating an exemplary configuration of an image sensor 2 of FIG. 1.

FIG. 2 is a block diagram illustrating an exemplary configuration of the image sensor 2 of FIG. 1.

The image sensor 2 includes a pixel access unit 11, a column interface (I/F) unit 12, and a signal processing unit 13.

The pixel access unit 11 includes a pixel array unit 21, a row scanning unit 22, column processing units 23N and 23S, and column scanning units 24N and 24S. The image sensor 2 is an image sensor capable of north and south simultaneous reading.

The pixel array unit 21 of the pixel access unit 11 has a configuration in which a plurality of pixels that outputs electric signals by photoelectric conversion is arranged two-dimensionally and regularly. In response to control signals supplied from the row scanning unit 22, the pixel array unit 21 reads the electric signals from the pixels that constitute the pixel array unit 21, and supplies the electric signals to the column processing units 23N and 23S.

The row scanning unit 22 performs control for reading the electric signals from the pixels of the pixel array unit 21.

The column processing unit 23N performs processing such as A/D conversion on the electric signals (voltages) supplied from the pixel array unit 21 in response to control signals supplied from the column scanning unit 24N. The column processing unit 23N outputs a digital signal obtained by performing processing such as A/D conversion as a pixel value to the column I/F unit 12.

The column scanning unit 24N controls operations of the column processing unit 23N to output the pixel value from the column processing unit 23N to the column I/F unit 12.

The column processing unit 23S performs processing such as A/D conversion on the electric signals (voltages) supplied from the pixel array unit 21 in response to control signals supplied from the column scanning unit 24S. The column processing unit 23S outputs a digital signal obtained by performing processing such as A/D conversion as a pixel value to the column I/F unit 12.

The column scanning unit 24S controls operations of the column processing unit 23S to output the pixel value from the column processing unit 23S to the column I/F unit 12.

The column I/F unit 12 incorporates a line memory and temporarily stores the pixel values supplied from the column processing units 23N and 23S of the pixel access unit 11. The column I/F unit 12 functions as an interface that receives the pixel values from the pixel access unit 11.

The signal processing unit 13 performs rearrangement of pixels, correction of pixel centroid, and other necessary signal processing using the pixel values stored in the column I/F unit 12, and outputs processed signals to outside of the image sensor 2.

<3. Exemplary Configuration of Pixel Access Unit 11>

Figure 3:
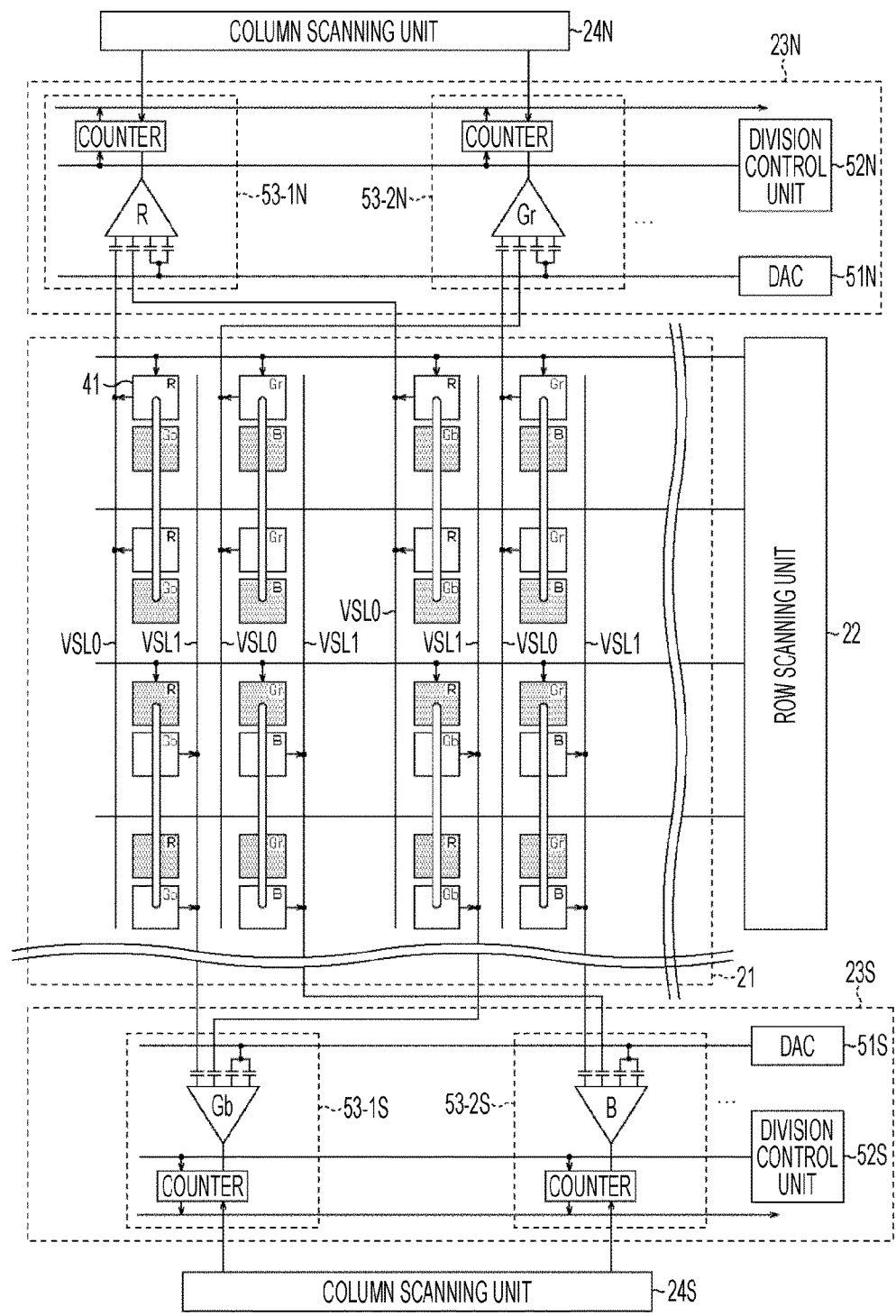
FIG. 3 is a diagram conceptually illustrating a configuration of a pixel access unit 11 of FIG. 2.

FIG. 3 is a diagram conceptually illustrating a configuration of the pixel access unit 11 of FIG. 2.

As described with reference to FIG. 2, the pixel access unit 11 includes the pixel array unit 21, the row scanning unit 22, the column processing units 23N and 23S, and the column scanning units 24N and 24S. In FIG. 3, the row scanning unit 22 is illustrated on a right side of the pixel array unit 21.

The pixel array unit 21 has the configuration in which pixels 41 are arranged two-dimensionally and regularly. In FIG. 3, R, Gb, Gr, or B in an upper right of each pixel 41 represents color of the pixel. The pixel array unit 21 includes, for example, the pixels 41 arranged by the Bayer arrangement.

Hereinafter, the pixels 41 will be denoted with attached numerals representing positions in row and column directions as needed. In addition, each pixel 41 will be described by adding alphabets indicating color. For example, a Gr pixel $41_{(1, 2)}$ is a Gr pixel at a position of row 1 and column 2.

Figure 4:
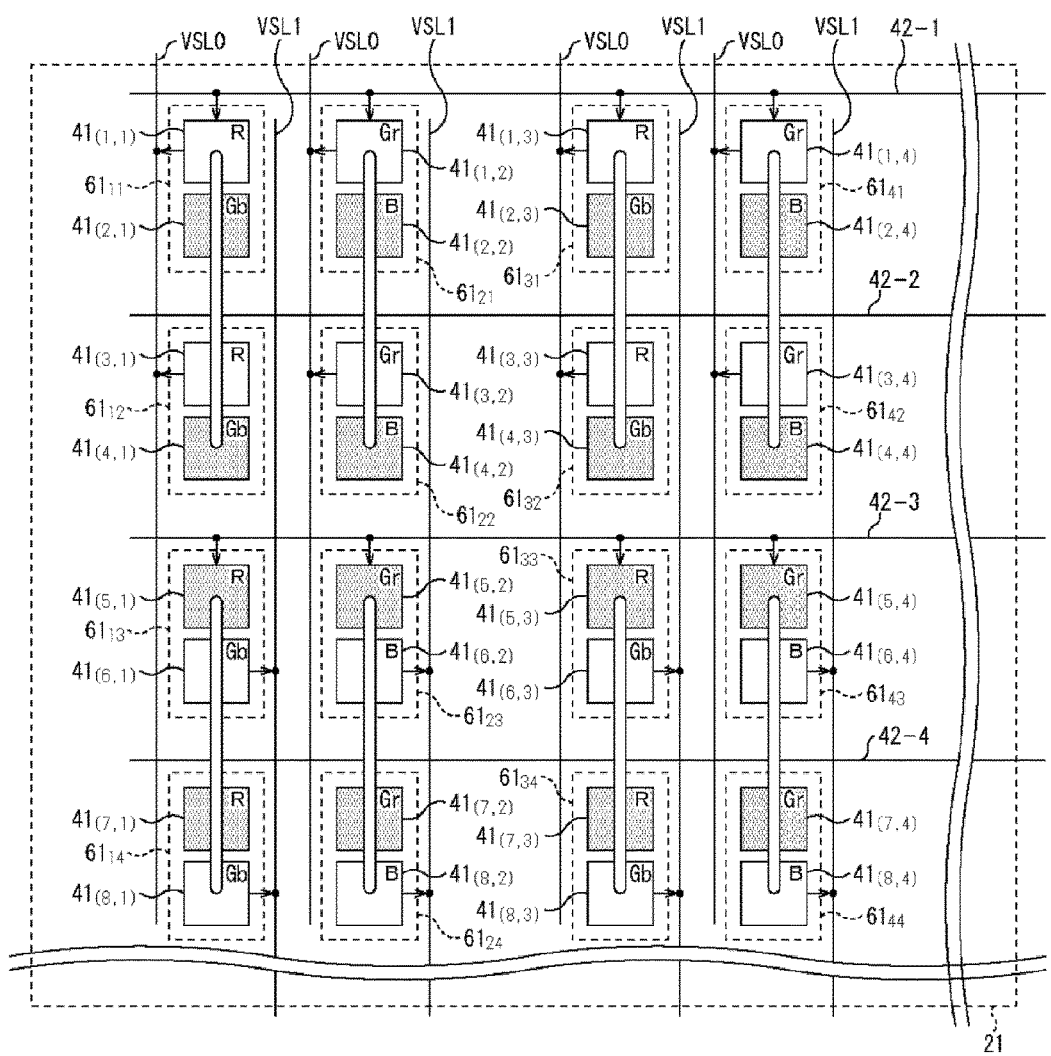
FIG. 4 is a diagram illustrating an enlarged pixel array unit 21.

FIG. 4 is a diagram illustrating the enlarged pixel array unit 21.

As illustrated in FIG. 4, out of the pixels 41 in the same column, one pixel 41 in each odd-numbered row and one pixel 41 in an even-numbered row thereunder by one row constitute a pixel unit 61 that shares FD.

When attention is paid to a first column, an R pixel $41_{(1, 1)}$ of a first row and a Gb pixel $41_{(2, 1)}$ of a second row constitute a pixel unit $61_{11}$, whereas an R pixel $41_{(3, 1)}$ of a third row and a Gb pixel $41_{(4, 1)}$ of a fourth row constitute a pixel unit $61_{12}$.

In addition, in the first column, an R pixel $41_{(5, 1)}$ of a fifth row and a Gb pixel $41_{(6, 1)}$ of a sixth row constitute a pixel unit $61_{13}$, whereas an R pixel $41_{(7, 1)}$ of a seventh row and a Gb pixel $41_{(8, 1)}$ of an eighth row constitute a pixel unit $61_{14}$.

In FIG. 4, a vertical straight line with a white blank inside connecting two pixel units 61 represents FD shared between the two pixel units 61. As will be described later, turning on of a switch (transistor) for sharing FD that connects the pixel units 61 causes the two pixel units 61 to be electrically connected to share the FD.

The pixel unit $61_{11}$ and the pixel unit $61_{12}$, and the pixel unit $61_{13}$ and the pixel unit $61_{14}$ of the first column are each a pair of pixel units that shares FD.

In the pixel array unit 21, VSL 0 and VSL 1, which are two vertical signal lines, are wired for one column of the pixels 41 in a vertical direction. The VSL 0 wired on a left side of the column is connected to the column processing unit 23N provided on an upper side (north side) that is one end side of the pixel array unit 21. In addition, the VSL 1 wired on a right side of the column is connected to the column processing unit 23S provided on a lower side (south side) that is the other end side of the pixel array unit 21.

Out of four pixels 41 included in pixel units 61 that share FD, two pixels 41 of the same color are pixels in which weighted addition is performed in FD. Electric signals from the two pixels 41 of the same color are transferred to the column processing unit 23N or the column processing unit 23S with shifted transfer timing by using one vertical signal line.

During reading by weighted addition in FD, pixels of the same color in odd-numbered rows are connected to the VSL 0, whereas pixels of the same color in even-numbered rows are connected to the VSL 1. In FIG. 4, out of four pixels 41 included in pixel units 61 that share FD, pixels connected to the vertical signal line are pixels from which electric signals are being read. Colored pixels 41 are pixels from which electric signals are not being read.

Out of the pixels 41 of the first to fourth row and the first column, the electric signals read from the R pixel $41_{(1, 1)}$ of the first row and the R pixel $41_{(3, 1)}$ of the third row are supplied to the column processing unit 23N through the VSL 0.

In addition, out of the pixels 41 of the fifth to eighth row and the first column, the electric signals read from the Gb pixel $41_{(6, 1)}$ of the sixth row and the Gb pixel $41_{(8, 1)}$ of the eighth row are supplied to the column processing unit 23S through the VSL 1.

In the pixels 41 of the first column, reading of the signals of the two R pixels using the VSL 0 and reading of the signals of the two Gb pixels using the VSL 1 are performed, for example, simultaneously. In the pixel access unit 11, north and south simultaneous reading is performed using two vertical signal lines per one column.

Other columns also have similar configurations. In the second column, a Gr pixel $41_{(1, 2)}$ of the first row and a B pixel $41_{(2, 2)}$ of the second row constitute a pixel unit $61_{21}$, whereas a Gr pixel $41_{(3, 2)}$ of the third row and a B pixel $41_{(4, 2)}$ of the fourth row constitute a pixel unit $61_{22}$. The pixel unit $61_{21}$ and the pixel unit $61_{22}$ are a pair of pixel units that shares FD.

In addition, in the second column, a Gr pixel $41_{(5, 2)}$ of the fifth row and a B pixel $41_{(6, 2)}$ of the sixth row constitute a pixel unit $61_{23}$, whereas a Gr pixel $41_{(7, 2)}$ of the seventh row and a B pixel $41_{(8, 2)}$ of the eighth row constitute a pixel unit $61_{24}$. The pixel unit $61_{23}$ and the pixel unit $61_{24}$ are a pair of pixel units that shares FD.

Out of the pixels 41 of the first to fourth row and the second column, the electric signals read from the Gr pixel $41_{(1, 2)}$ of the first row and the Gr pixel $41_{(3, 2)}$ of the third row are supplied to the column processing unit 23N through the VSL 0.

In addition, out of the pixels 41 of the fifth to eighth row and the second column, the electric signals read from the B pixel $41_{(6, 2)}$ of the sixth row and the B pixel $41_{(8, 2)}$ of the eighth row are supplied to the column processing unit 23S through the VSL 1.

In the third column, an R pixel $41_{(1,\ 3)}$ of the first row and a Gb pixel $41_{(2,\ 3)}$ of the second row constitute a pixel unit $61_{31}$, whereas an R pixel $41_{(3,\ 3)}$ of the third row and a Gb pixel $41_{(4,\ 3)}$ of the fourth row constitute a pixel unit $61_{32}$. The pixel unit $61_{31}$ and the pixel unit $61_{32}$ are a pair of pixel units that shares FD.

In addition, in the third column, an R pixel $41_{(5,\ 3)}$ of the fifth row and a Gb pixel $41_{(6,\ 3)}$ of the sixth row constitute a pixel unit $61_{33}$, whereas an R pixel $41_{(7,\ 3)}$ of the seventh row and a Gb pixel $41_{(8,\ 3)}$ of the eighth row constitute a pixel unit $61_{34}$. The pixel unit $61_{33}$ and the pixel unit $61_{34}$ are a pair of pixel units that shares FD.

Out of the pixels 41 of the first to fourth row and the third column, the electric signals read from the R pixel $41_{(1,\ 3)}$ of the first row and the R pixel $41_{(3,\ 3)}$ of the third row are supplied to the column processing unit 23N through the VSL 0.

In addition, out of the pixels 41 of the fifth to eighth row and the third column, the electric signals read from the Gb pixel $41_{(6,\ 3)}$ of the sixth row and the Gb pixel $41_{(8,\ 3)}$ of the eighth row are supplied to the column processing unit 23S through the VSL 1.

In the fourth column, a Gr pixel $41_{(1,\ 4)}$ of the first row and a B pixel $41_{(2,\ 4)}$ of the second row constitute a pixel unit $61_{41}$, whereas a Gr pixel $41_{(3,\ 4)}$ of the third row and a B pixel $41_{(4,\ 4)}$ of the fourth row constitute a pixel unit $61_{42}$. The pixel unit $61_{41}$ and the pixel unit $61_{42}$ are a pair of pixel units that shares FD.

In addition, in the fourth column, a Gr pixel $41_{(5,\ 4)}$ of the fifth row and a B pixel $41_{(6,\ 4)}$ of the sixth row constitute a pixel unit $61_{43}$, whereas a Gr pixel $41_{(7,\ 4)}$ of the seventh row and a B pixel $41_{(8,\ 4)}$ of the eighth row constitute a pixel unit $61_{44}$. The pixel unit $61_{43}$ and the pixel unit $61_{44}$ are a pair of pixel units that shares FD.

Out of the pixels 41 of the first to fourth row and the fourth column, the electric signals read from the Gr pixel $41_{(1,\ 4)}$ of the first row and the Gr pixel $41_{(3,\ 4)}$ of the third row are supplied to the column processing unit 23N through the VSL 0.

In addition, out of the pixels 41 of the fifth to eighth row and the fourth column, the electric signals read from the B pixel $41_{(6,\ 4)}$ of the sixth row and the B pixel $41_{(8,\ 4)}$ of the eighth row are supplied to the column processing unit 23S through the VSL 1.

Thus, in the pixel access unit 11, in each column, it is possible to simultaneously perform reading of the electric signals from the pixels 41 of two predetermined odd-numbered rows out of four adjacent pixels that share FD, and reading of the electric signals from the pixels 41 of two predetermined even-numbered rows out of four adjacent pixels that do not share FD with the above four pixels.

This is similarly applied to reading of the electric signals from the colored pixels 41 in FIGS. 3 and 4. That is, it is possible to simultaneously perform reading of the electric signals from the pixels 41 of two predetermined even-numbered rows out of four adjacent pixels that share FD, and reading of the electric signals from the pixels 41 of two predetermined odd-numbered rows out of four adjacent pixels that do not share FD with the above four pixels.

In the pixel array unit 21, row signal lines 42-1 to 42-4 are wired for each pixel unit 61 of each column in a row direction (horizontal direction).

The row scanning unit 22 supplies the control signal to the row signal line 42-1, and performs access control on the pixel unit 61 that includes the pixel 41 of the first row and the pixel 41 of the second row.

In addition, the row scanning unit 22 supplies the control signal to the row signal line 42-2, and performs access control on the pixel unit 61 that includes the pixel 41 of the third row and the pixel 41 of the fourth row.

The row scanning unit 22 supplies the control signal to the row signal line 42-3, and performs access control on the pixel unit 61 that includes the pixel 41 of the fifth row and the pixel 41 of the sixth row.

The row scanning unit 22 supplies the control signal to the row signal line 42-4, and performs access control on the pixel unit 61 that includes the pixel 41 of the seventh row and the pixel 41 of the eighth row.

Returning to description of FIG. 3, the column processing unit 23N includes a digital analog converter (DAC) 51N, a division control unit 52N, an A/D converter (ADC) 53-1N, and an ADC 53-2N. The number of ADCs to be provided is half of the number of columns of the pixels 41 that constitute the pixel array unit 21.

The DAC 51N generates an analog reference signal that has a period in which a level varies from an initial value to a final value at a constant inclination, for example like a ramp signal, and supplies the analog reference signal to the ADCs 53-1N and 53-2N.

The division control unit 52N controls a frequency of a clock signal that serves as a basis for a counting operation of the ADCs 53-1N and 53-2N.

Figure 5:
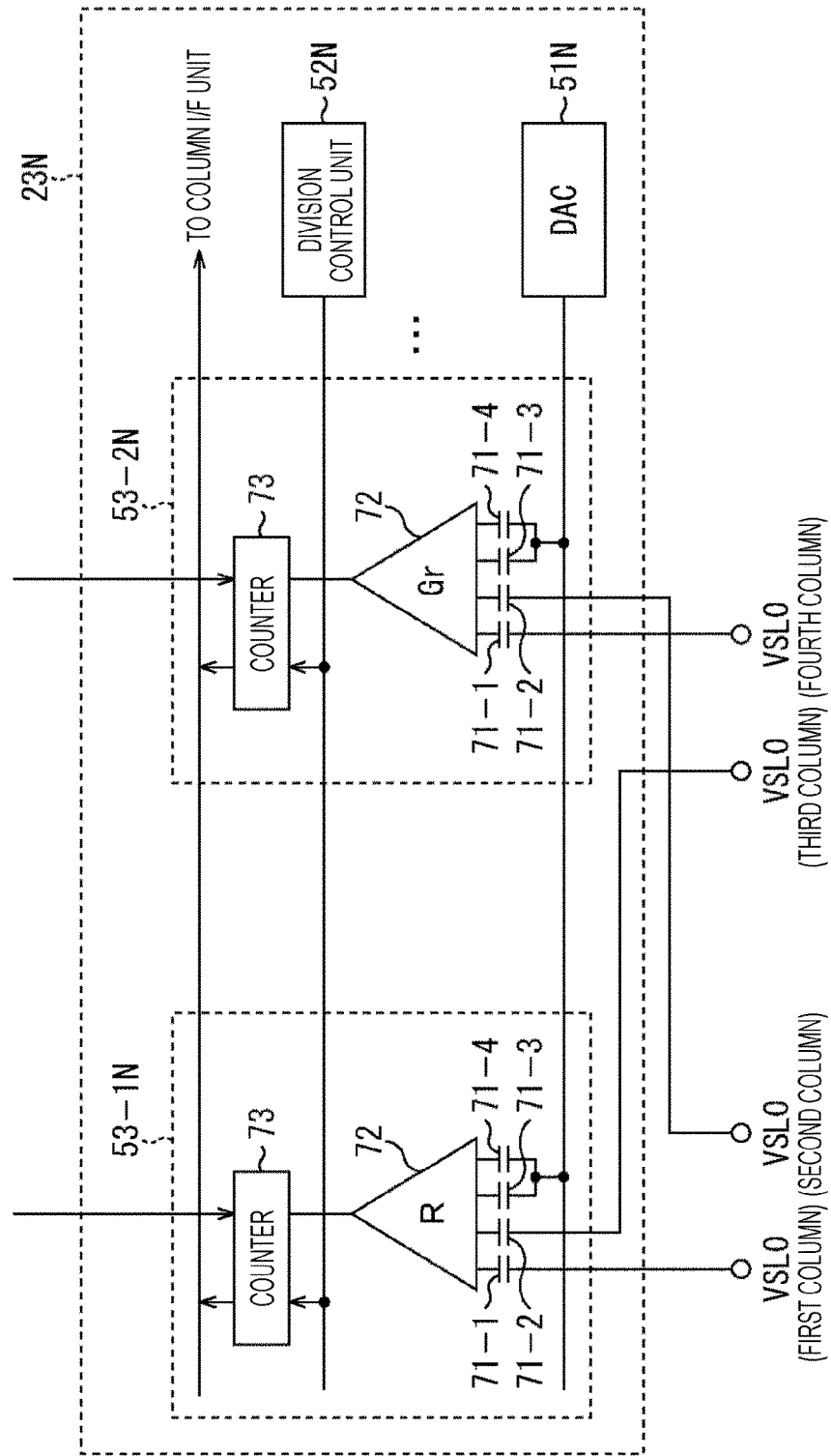
FIG. 5 is a diagram illustrating an enlarged column processing unit 23N.

FIG. 5 is a diagram illustrating the enlarged column processing unit 23N.

The ADC 53-1N includes capacitances 71-1 to 71-4, a comparator 72, and a counter 73. The capacitances 71-1 to 71-4 are provided on an input side of the comparator 72.

The VSL 0 of the first column is connected to the capacitance 71-1. The electric signal of the R pixel of the first column that is read using the VSL 0 is supplied to the comparator 72 through the capacitance 71-1.

The VSL 0 of the third column is connected to the capacitance 71-2. The electric signal of the R pixel of the third column that is read using the VSL 0 is supplied to the comparator 72 through the capacitance 71-2.

The electric signal of the R pixels to be supplied to the comparator 72 is a signal resulting from weighted addition of the electric signal of the R pixel of the first row and the electric signal of the R pixel of the third row according to the capacitances of the capacitance 71-1 and the capacitance 71-2. In the pixel access unit 11, horizontal weighted addition of the pixel signals is performed using the capacitances provided on an input side of the comparator 72.

The reference signal from the DAC 51N is supplied to the capacitances 71-3 and 71-4 provided in parallel.

The comparator 72 compares the signal resulting from the weighted addition of the electric signal of the R pixel of the first column and the electric signal of the R pixel of the third column, with the reference signal supplied from the DAC 51N. The comparator 72 then outputs a comparison result to the counter 73.

The counter 73 counts time needed for variation of the level of the reference signal until a level of the electric signal resulting from the weighted addition of the electric signal of the R pixel of the first column and the electric signal of the R pixel of the third column agrees with the level of the reference signal, thereby performing processing such as A/D conversion on the electric signal. The frequency of the clock signal that serves as a basis for the counting operation is switched as appropriate in response to the control signal supplied from the division control unit 52N.

The counter 73 outputs, to the column I/F unit 12 (FIG. 2), the pixel value of the R pixels, which is a digital electric signal, resulting from processing such as A/D conversion in response to control of the column scanning unit 24N.

Thus, the ADC 53-1N performs processing such as A/D conversion on the result of the weighted addition of the electric signals of the R pixels that are read using the VSL 0 of two predetermined odd-numbered columns.

The ADC 53-2N also has a configuration similar to the configuration of the ADC 53-1N.

The VSL 0 of the fourth column is connected to the capacitance 71-1 of the ADC 53-2N. The electric signal of the Gr pixel of the fourth column that is read using the VSL 0 is supplied to the comparator 72 through the capacitance 71-1.

The VSL 0 of the second column is connected to the capacitance 71-2. The electric signal of the Gr pixel of the second column that is read using the VSL 0 is supplied to the comparator 72 through the capacitance 71-2.

The electric signal of the Gr pixels to be supplied to the comparator 72 is a signal resulting from weighted addition of the electric signal of the Gr pixel of the fourth row and the electric signal of the Gr pixel of the second row according to the capacitances of the capacitance 71-1 and the capacitance 71-2.

The comparator 72 compares the signal resulting from the weighted addition of the electric signal of the Gr pixel of the fourth column and the electric signal of the Gr pixel of the second column, with the reference signal supplied from the DAC 51N. The comparator 72 then outputs a comparison result to the counter 73.

The counter 73 performs processing such as A/D conversion on the electric signal resulting from the weighted addition of the electric signal of the Gr pixel of the fourth column and the electric signal of the Gr pixel of the second column. The frequency of the clock signal that serves as a basis for the counting operation is switched as appropriate in response to the control signal supplied from the division control unit 52N.

The counter 73 outputs, to the column I/F unit 12, the pixel value of the Gr pixels, which is a digital electric signal, resulting from processing such as A/D conversion in response to control of the column scanning unit 24N.

Figure 6:
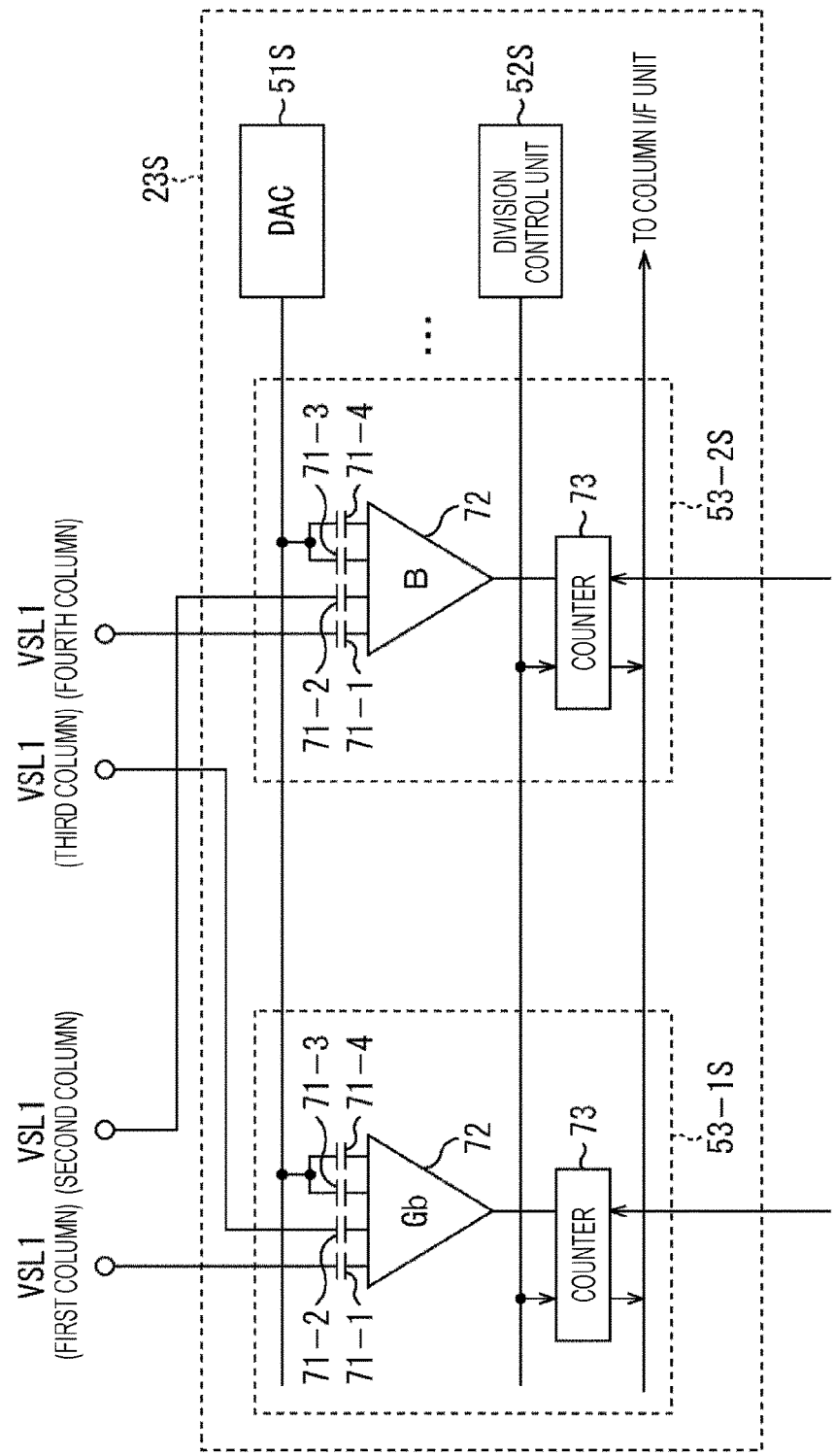
FIG. 6 is a diagram illustrating an enlarged column processing unit 23S.

FIG. 6 is a diagram illustrating the enlarged column processing unit 23S. The column processing unit 23S has a configuration similar to the configuration of the column processing unit 23N.

The ADC 53-1S includes capacitances 71-1 to 71-4, a comparator 72, and a counter 73. The capacitances 71-1 to 71-4 are provided on an input side of the comparator 72.

The VSL 1 of the first column is connected to the capacitance 71-1 of the ADC 53-1S. The electric signal of the Gb pixel of the first column that is read using the VSL 1 is supplied to the comparator 72 through the capacitance 71-1.

The VSL 1 of the third column is connected to the capacitance 71-2. The electric signal of the Gb pixel of the third column that is read using the VSL 1 is supplied to the comparator 72 through the capacitance 71-2.

The electric signal of the Gb pixels to be supplied to the comparator 72 is a signal resulting from weighted addition of the electric signal of the Gb pixel of the first row and the electric signal of the Gb pixel of the third row according to the capacitances of the capacitance 71-1 and the capacitance 71-2.

The reference signal from the DAC 51S is supplied to the capacitances 71-3 and 71-4 provided in parallel.

The comparator 72 compares the signal resulting from the weighted addition of the electric signal of the Gb pixel of the first column and the electric signal of the Gb pixel of the third column, with the reference signal supplied from the DAC 51S. The comparator 72 then outputs a comparison result to the counter 73.

The counter 73 performs processing such as A/D conversion on the electric signal resulting from the weighted addition of the electric signal of the Gb pixel of the first column and the electric signal of the Gb pixel of the third column. The frequency of the clock signal that serves as a basis for the counting operation is switched as appropriate in response to the control signal supplied from the division control unit 52S.

The counter 73 outputs, to the column I/F unit 12, the pixel value of the Gb pixels, which is a digital electric signal, resulting from processing such as A/D conversion in response to control of the column scanning unit 24S.

Thus, the ADC 53-1S performs processing such as A/D conversion on the result of the weighted addition of the electric signals of the Gb pixels that are read using the VSL 1 of two predetermined odd-numbered columns.

The ADC 53-2S also has a configuration similar to the configuration of the ADC 53-1S.

The VSL 1 of the fourth column is connected to the capacitance 71-1 of the ADC 53-2S. The electric signal of the B pixel of the fourth column that is read using the VSL 1 is supplied to the comparator 72 through the capacitance 71-1.

The VSL 1 of the second column is connected to the capacitance 71-2. The electric signal of the B pixel of the second column that is read using the VSL 1 is supplied to the comparator 72 through the capacitance 71-2.

The electric signal of the B pixels to be supplied to the comparator 72 is a signal resulting from weighted addition of the electric signal of the B pixel of the fourth row and the electric signal of the B pixel of the second row according to the capacitances of the capacitance 71-1 and the capacitance 71-2.

The comparator 72 compares the signal resulting from the weighted addition of the electric signal of the B pixel of the fourth column and the electric signal of the B pixel of the second column, with the reference signal supplied from the DAC 51S. The comparator 72 then outputs a comparison result to the counter 73.

The counter 73 performs processing such as A/D conversion on the electric signal resulting from the weighted addition of the electric signal of the B pixel of the fourth column and the electric signal of the B pixel of the second column. The frequency of the clock signal that serves as a basis for the counting operation is switched as appropriate in response to the control signal supplied from the division control unit 52S.

The counter 73 outputs, to the column I/F unit 12, the pixel value of the B pixels, which is a digital electric signal, resulting from processing such as A/D conversion in response to control of the column scanning unit 24S.

Note that one DAC can serve as both the DAC 51N and the DAC 51S. In addition, one circuit can serve as both the division control unit 52N and the division control unit 52S.

<4. Exemplary Circuit Configuration of Pixel Unit>

Figure 7:
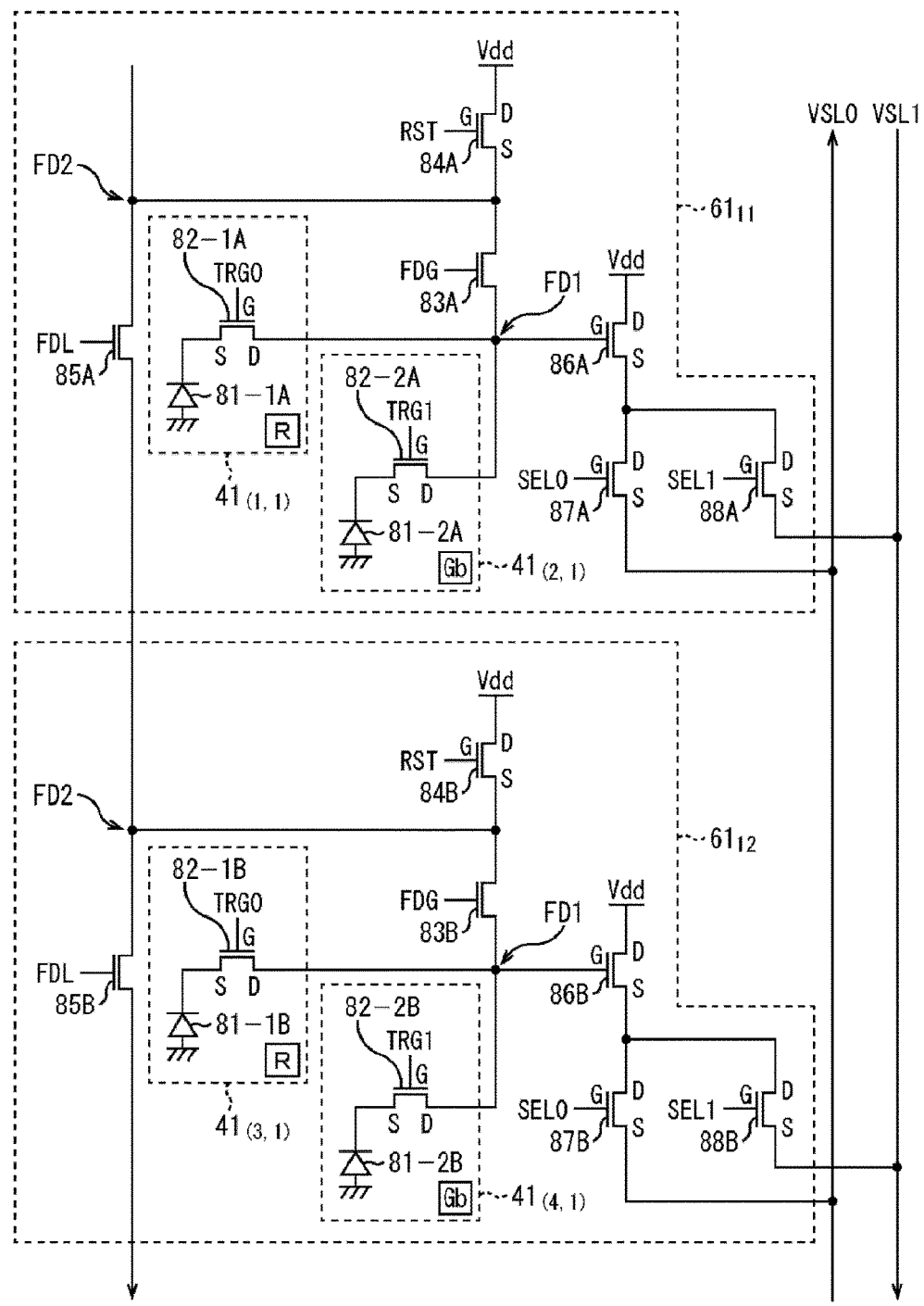
FIG. 7 is a circuit diagram illustrating an exemplary configuration of two pixel units 61.

FIG. 7 is a circuit diagram illustrating an exemplary configuration of the pixel units 61.

FIG. 7 illustrates configurations of the pixel unit 61$_{11}$ including the R pixel 41$_{(1,\,1)}$ and the Gb pixel 41$_{(2,\,1)}$, and the pixel unit 61$_{12}$ including the R pixel 41$_{(3,\,1)}$ and the Gb pixel 41$_{(4,\,1)}$.

The R pixel 41$_{(1,\,1)}$ of the pixel unit 61$_{11}$ includes a photo diode (PD) 81-1A and a transfer Tr 82-1A.

The PD 81-1A is one example of a photoelectric conversion element, receives incident light, and accumulates an electric charge corresponding to the incident light, thereby performing photoelectric conversion. An anode of the PD 81-1A is connected to a ground (grounded), and a cathode of the PD 81-1A is connected to a source of the transfer Tr 82-1A.

The transfer Tr 82-1A is a transistor (Tr) for transferring the electric charge accumulated in the PD 81-1A to floating diffusion (FD) 1.

The Gb pixel $41_{(2,\ 1)}$ includes a PD 81-2A and a transfer Tr 82-2A.

The PD 81-2A receives incident light and performs photoelectric conversion. An anode of the PD 81-2A is connected to a ground, and a cathode of the PD 81-2A is connected to a source of the transfer Tr 82-2A.

The transfer Tr 82-2A is a transistor for transferring the electric charge accumulated in the PD 81-2A to the FD 1.

In the pixel unit $61_{11}$, as a configuration to read electric signals from the R pixel $41_{(1,\ 1)}$ and the Gb pixel $41_{(2,\ 1)}$, an FD sharing Tr 83A, a reset Tr 84A, an FD sharing Tr 85A, an amplification Tr 86A, a selection Tr 87A, and a selection Tr 88A are provided. Each Tr is, for example, an FET.

The control signals the row scanning unit 22 of FIG. 2 passes through the row signal line 42-1 for controlling the R pixel $41_{(1,\ 1)}$ and the Gb pixel $41_{(1,\ 2)}$ include transfer pulses TRG 0 and TRG 1, a reset pulse RST, selection pulses SEL 0 and SEL 1, and FD sharing pulses FDG and FDL. As the row signal line 42-1, a control line exists through which each of these control signals flows.

The source of the transfer Tr 82-1A of the R pixel $41_{(1,\ 1)}$ is connected to the cathode of the PD 81-1A, and a drain of the transfer Tr 82-1A is connected to a gate of the amplification Tr 86A through the FD 1. The transfer pulse TRG 0 is supplied to a gate of the transfer Tr 82-1A through the row signal line 42-1.

The source of the transfer Tr 82-2A of the Gb pixel $41_{(2,\ 1)}$ is connected to the cathode of the PD 81-2A, and a drain of the transfer Tr 82-2A is connected to the gate of the amplification Tr 86A through the FD 1. The transfer pulse TRG 1 is supplied to a gate of the transfer Tr 82-2A through the row signal line 42-1.

One terminal of the FD sharing Tr 83A is connected to the FD 1. The FD 1 is a region formed at a node of the one terminal of the FD sharing Tr 83A and the gate of the amplification Tr 86A. In the FD 1, the electric charge supplied from the PD 81-1A through the transfer Tr 82-1A or the electric charge supplied from the PD 81-2A through the transfer Tr 82-2A is converted into a voltage like a capacitor.

The FD sharing Tr 83A is a transistor for switching sharing/non-sharing of the FD. The FD sharing pulse FDG is supplied to a gate of the FD sharing Tr 83A through the row signal line 42-1.

The reset Tr 84A is a transistor for resetting the electric charge (voltage) accumulated in the FD 1 and FD 2. A drain of the reset Tr 84A is connected to a power source Vdd, and a source of the reset Tr 84A is connected to the FD 1 through the FD sharing Tr 83A, and connected to the FD 2. The FD 2 is FD formed at a node of the FD sharing Tr 83A and the FD sharing Tr 85A. The reset pulse RST is supplied to a gate of the reset Tr 84A through the row signal line 42-1.

The FD sharing Tr 85A is a transistor for switching sharing/non-sharing of the FD. The FD 2 of the pixel unit $61_{11}$ is connected to one terminal of the FD sharing Tr 85A, whereas the FD 2 of the pixel unit $61_{12}$, which is the adjacent pixel unit 61, is connected to the other terminal. The FD sharing pulse FDL is supplied to a gate of the FD sharing Tr 85A through the row signal line 42-1.

The amplification Tr 86A is a transistor for buffering the voltage of the FD. The gate of the amplification Tr 86A is connected to the FD 1, and a drain of the amplification Tr 86A is connected to the power source Vdd. A source of the amplification Tr 86A is connected to drains of the selection Tr 87A and the selection Tr 88A.

The selection Tr 87A is a transistor for selecting output of the electric signal (voltage) to the VSL 0. A source of the selection Tr 87A is connected to the VSL 0. The selection pulse SEL 0 is supplied to a gate of the selection Tr 87A through the row signal line 42-1.

Turning on of the selection Tr 87A by the selection pulse SEL 0 causes the voltage corresponding to the electric charge that is read from the R pixel $41_{(1,\ 1)}$ and accumulated in the FD to be supplied to the ADC 53-1N through the amplification Tr 86A and the VSL 0.

The selection Tr 88A is a transistor for selecting electric signal output to the VSL1. A source of the selection Tr 88A is connected to the VSL1. The selection pulse SEL 1 is supplied to a gate of the selection Tr 88A through the row signal line 42-1.

Turning on of the selection Tr 88A by the selection pulse SEL 1 causes the voltage corresponding to the electric charge that is read from the Gb pixel $41_{(2,\ 1)}$ and accumulated in the FD to be supplied to the ADC 53-1S through the amplification Tr 86A and the VSL 1.

The pixel unit $61_{12}$ also has a configuration identical to the above-described configuration of the pixel unit $61_{11}$.

The R pixel $41_{(3,\ 1)}$ of the pixel unit $61_{12}$ includes a PD 81-1B and a transfer Tr 82-1B.

The PD 81-1B receives incident light and performs photoelectric conversion. An anode of the PD 81-1B is connected to a ground, and a cathode of the PD 81-1B is connected to a source of the transfer Tr 82-1B.

The transfer Tr 82-1B is a transistor for transferring the electric charge accumulated in the PD 81-1B to the FD 1.

The Gb pixel $41_{(4,\ 1)}$ includes a PD 81-2B and a transfer Tr 82-2B.

The PD 81-2B receives incident light and performs photoelectric conversion. An anode of the PD 81-2B is connected to a ground, and a cathode of the PD 81-2B is connected to a source of the transfer Tr 82-2B.

The transfer Tr 82-2B is a transistor for transferring the electric charge accumulated in the PD 81-1B to the FD 1.

In the pixel unit $61_{12}$, as a configuration to read electric signals from the R pixel $41_{(3,\ 1)}$ and the Gb pixel $41_{(4,\ 1)}$, an FD sharing Tr 83B, a reset Tr 84B, an FD sharing Tr 85B, an amplification Tr 86B, a selection Tr 87B, and a selection Tr 88B are provided.

The control signals the row scanning unit 22 of FIG. 2 passes through the row signal line 42-2 for controlling the R pixel $41_{(3,\ 1)}$ and the Gb pixel $41_{(4,\ 2)}$ include transfer pulses TRG 0 and TRG 1, a reset pulse RST, selection pulses SEL 0 and SEL 1, and FD sharing pulses FDG and FDL.

The source of the transfer Tr 82-1B of the R pixel $41_{(3,\ 1)}$ is connected to the cathode of the PD 81-1B, and a drain of the transfer Tr 82-1B is connected to a gate of the amplification Tr 86B through the FD 1. The transfer pulse TRG 0 is supplied to a gate of the transfer Tr 82-1B through the row signal line 42-2.

The source of the transfer Tr 82-2B of the Gb pixel $41_{(4,\ 1)}$ is connected to the cathode of the PD 81-2B, and a drain of the transfer Tr 82-2B is connected to the gate of the amplification Tr 86B through the FD 1. The transfer pulse TRG 1 is supplied to a gate of the transfer Tr 82-2B through the row signal line 42-2.

One terminal of the FD sharing Tr 83B is connected to the FD 1 of the pixel unit 61$_{12}$. The FD 1 is a region formed at a node of the one terminal of the FD sharing Tr 83B and the gate of the amplification Tr 86B. In the FD 1, the electric charge supplied from the PD 81-1B through the transfer Tr 82-1B or the electric charge supplied from the PD 81-2B through the transfer Tr 82-2B is converted into a voltage like a capacitor.

The FD sharing Tr 83B is a transistor for switching sharing/non-sharing of the FD. The FD sharing pulse FDG is supplied to a gate of the FD sharing Tr 83B through the row signal line 42-2.

The reset Tr 84B is a transistor for resetting the electric charge accumulated in the FD 1 and the FD 2. A drain of the reset Tr 84B is connected to the power source Vdd, and a source of the reset Tr 84B is connected to the FD 1 through the FD sharing Tr 83B and connected to the FD 2. The FD 2 is FD formed at a node of the FD sharing Tr 83B and the FD sharing Tr 85B. The reset pulse RST is supplied to a gate of the reset Tr 84B through the row signal line 42-2.

The FD sharing Tr 85B is a transistor for switching sharing/non-sharing of the FD. The FD 2 of the pixel unit 61$_{12}$ is connected to one terminal of the FD sharing Tr 85B, whereas FD 2 of the pixel unit 61$_{13}$, which is an adjacent pixel unit 61, is connected to the other terminal. The FD sharing pulse FDL is supplied to a gate of the FD sharing Tr 85B through the row signal line 42-2.

The amplification Tr 86B is a transistor for buffering the voltage of the FD. The gate of the amplification Tr 86B is connected to the FD 1, and a drain of the amplification Tr 86B is connected to the power source Vdd. A source of the amplification Tr 86B is connected to drains of the selection Tr 87B and the selection Tr 88B.

The selection Tr 87B is a transistor for selecting electric signal output to the VSL 0. A source of the selection Tr 87B is connected to the VSL 0. The selection pulse SEL 0 is supplied to a gate of the selection Tr 87B through the row signal line 42-2.

Turning on of the selection Tr 87B by the selection pulse SEL 0 causes the voltage corresponding to the electric charge that is read from the R pixel 41$_{(3, 1)}$ and accumulated in the FD to be supplied to the ADC 53-1N through the amplification Tr 86B and the VSL 0.

The selection Tr 88B is a transistor for selecting electric signal output to the VSL 1. A source of the selection Tr 88B is connected to the VSL 1. The selection pulse SEL 1 is supplied to a gate of the selection Tr 88B through the row signal line 42-2.

Turning on of the selection Tr 88B by the selection pulse SEL 1 causes the voltage corresponding to the electric charge that is read from the Gb pixel 41$_{(4, 1)}$ and accumulated in the FD to be supplied to the ADC 53-1S through the amplification Tr 86B and the VSL 1.

Each of the other pixel units 61 of FIG. 4 also includes a configuration identical to the above-described configuration.

<5. Reading Operation of Pixel Unit>

An operation of reading electric signals from the pixel unit 61$_{11}$ and the pixel unit 61$_{12}$ having the above-described configurations will be described.

Figure 8:
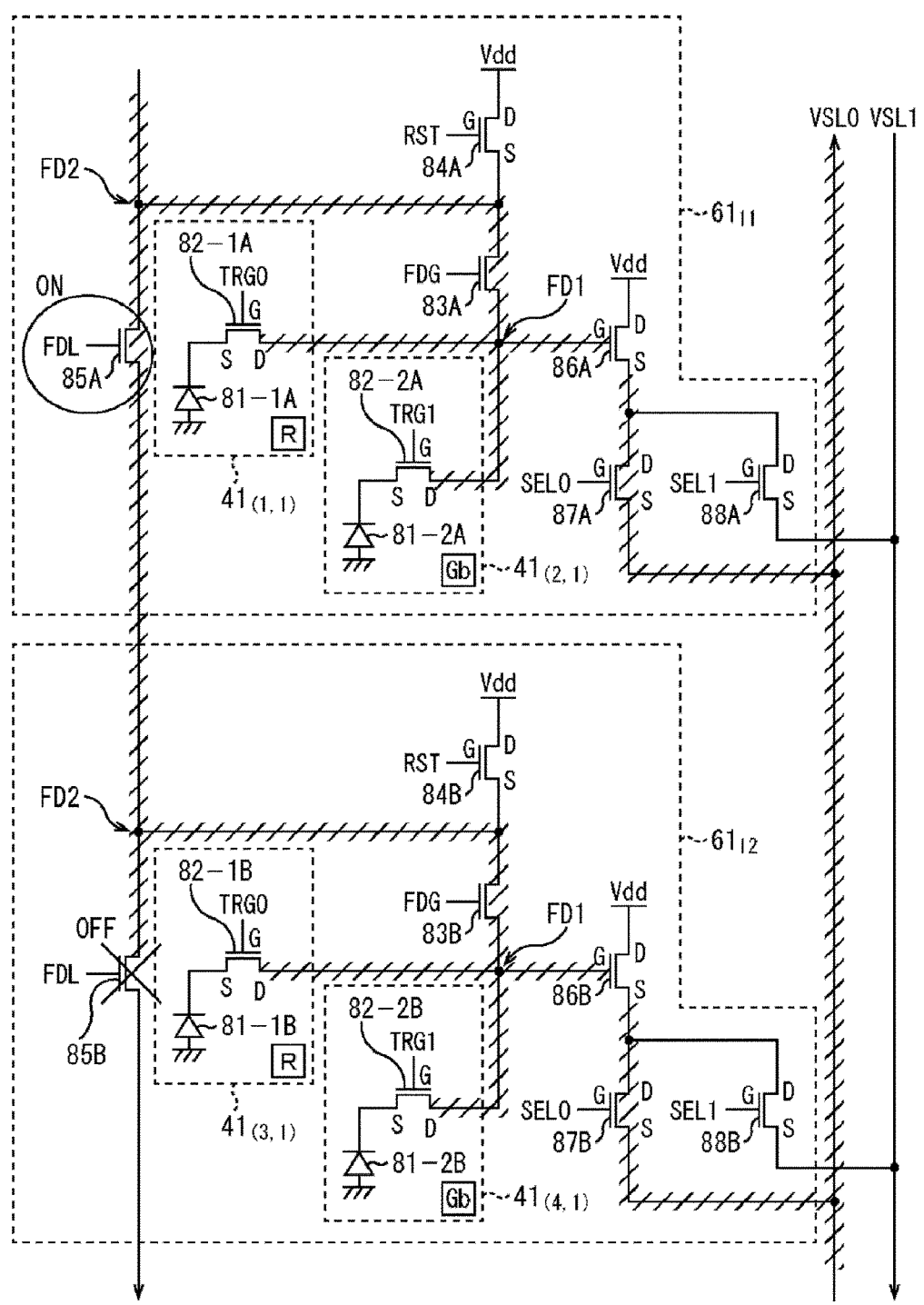
FIG. 8 is a diagram illustrating an electric signal flow.

FIG. 8 is a diagram illustrating an electric signal flow.

As illustrated in FIG. 8, when the FD sharing Tr 85A of the pixel unit 61$_{11}$ is in an on state and the FD sharing Tr 85B of the pixel unit 61$_{12}$ is in an off state, the pixel unit 61$_{11}$ and the pixel unit 61$_{12}$ share each FD. The FD sharing Tr 83A of the pixel unit 61$_{11}$ and the FD sharing Tr 83B of the pixel unit 61$_{12}$ are in an on state. This state is maintained during weighted addition in each FD and reading of the electric signals of the R pixel 41$_{(1, 1)}$ and the R pixel 41$_{(3, 1)}$, and the Gb pixel 41$_{(2, 1)}$ and the Gb pixel 41$_{(4, 1)}$.

With this arrangement, a capacitance of the FD that accumulates the electric charge transferred from the R pixel 41$_{(1, 1)}$ or the Gb pixel 41$_{(2, 1)}$ of the pixel unit 61$_{11}$ doubles from a capacitance of the FD of the single pixel unit 61$_{11}$. Similarly, a capacitance of the FD that accumulates the electric charge transferred from the R pixel 41$_{(3, 1)}$ or the Gb pixel 41$_{(4, 1)}$ of the pixel unit 61$_{12}$ doubles from a capacitance of the FD of the single pixel unit 61$_{12}$.

Here, a case where reading of the R pixel 41$_{(1, 1)}$ and the R pixel 41$_{(3, 1)}$ is performed will be described. Appropriately, the R pixel 41$_{(1, 1)}$ is referred to as an A pixel, whereas the R pixel 41$_{(3, 1)}$ is referred to as a B pixel. In addition, the transfer pulse TRG 0 to be supplied to the transfer Tr 82-1A of the R pixel 41$_{(1, 1)}$ is referred to as a transfer pulse TR_A, whereas the transfer pulse TRG 0 to be supplied to the transfer Tr 82-1B of the R pixel 41$_{(3, 1)}$ is referred to as a transfer pulse TR_B.

The A pixel and the B pixel receive light incident thereon and perform photoelectric conversion, thereby starting accumulation of the electric charges according to light quantity of the received incident light.

After resetting the electric charge of the FD, the row scanning unit 22 makes the transfer pulse TR_A an H level temporarily. This causes the transfer Tr 82-1A of the A pixel to be turned on.

Turning on of the transfer Tr 82-1A causes the electric charge accumulated in the PD 81-1A of the A pixel to be transferred to and accumulated in the FD after reset through the transfer Tr 82-1A. The electric charge is accumulated in the FD with the doubled capacitance.

The voltage corresponding to the electric charge accumulated in the FD is output onto the VSL 0 as an electric signal through the amplification Tr 86A and the selection Tr 87A. This causes a VSL voltage of the VSL 0 to be varied. At this time, the selection Tr 87A of the pixel unit 61$_{11}$ is in an on state.

After turning on the transfer Tr 82-1A and reading the A pixel, the row scanning unit 22 next makes the transfer pulse TR_B an H level temporarily. This causes the transfer Tr 82-1B of the B pixel to be turned on.

Turning on of the transfer Tr 82-1B causes the electric charge accumulated in the PD 81-1B of the B pixel to be transferred to and accumulated in the FD through the transfer Tr 82-1B.

Here, after making the transfer pulse TR_A an H level and before making the transfer pulse TR_B an H level, the row scanning unit 22 does not reset the FD. The electric charge of the B pixel is transferred to the FD with the doubled capacitance in which the electric charge of the A pixel has been accumulated, in a manner of so-called addition.

The voltage corresponding to the electric charge accumulated in the FD is output onto the VSL 0 as an electric signal through the amplification Tr 86B and the selection Tr 87B. This causes the VSL voltage of the VSL 0 to be varied. At this time, the selection Tr 87B of the pixel unit 61$_{12}$ is in an on state. The variation of the VSL voltage includes not only the variation caused by the electric charge read from the B pixel but also the variation caused by the electric charge read from the A pixel.

Thus, in the pixel unit 61$_{11}$ and the pixel unit 61$_{12}$, the A pixel and the B pixel are successively read without reset of the FD interposed. Slanted lines indicated on each signal line of FIG. 8 represent an image of the above-described reading of the electric signals.

Meanwhile, in the ADC 53-1N connected to the VSL 0 (FIG. 5), a reset level, which is the VSL voltage immediately after a reset operation of the FD is performed, undergoes A/D conversion.

In the ADC 53-1N, the A/D conversion of the reset level is successively performed twice. The first A/D conversion of the reset level is performed in accordance with the clock signal of a predetermined frequency, and the second A/D conversion is performed in accordance with the clock signal of a frequency that is half of the clock frequency used during the first A/D conversion. The reset level calculated by the A/D conversion is used for correlated double sampling (CDS) that calculates a difference from an A/D conversion result of the signal level as a pixel value.

In addition, in the ADC 53-1N, after the reset operation is finished, the signal level which is the VSL voltage after the transfer Tr 82-1A is turned on (voltage corresponding to the electric charge that is accumulated in the PD 81-1A and transferred to the FD) undergoes A/D conversion. The signal level that undergoes A/D conversion includes the reset level and a level that is a pixel value of the A pixel.

The first A/D conversion of the signal level is performed before the transfer pulse TR_B becomes an H level (before the electric signal of the B pixel is read) by using the clock signal of the frequency identical to the clock frequency used during the first A/D conversion of the reset level.

After the first A/D conversion of the signal level is finished, in the ADC 53-1N, the signal level that is the VSL voltage after the transfer Tr 82-1B is temporarily turned on undergoes A/D conversion. Since the FD is not reset before the electric signal of the B pixel is read, the signal level that undergoes A/D conversion includes the reset level, the level that is the pixel value of the A pixel, and a level that is a pixel value of the B pixel.

The second A/D conversion of the signal level is performed by using the clock signal of the frequency identical to the clock frequency used during the second A/D conversion of the reset level, that is, using the clock signal of a frequency that is half of the clock frequency used during the first A/D conversion.

In the ADC 53-1N, CDS is performed that calculates a difference between the A/D conversion result of the reset level and the A/D conversion result of the signal level as a pixel value. The ADC 53-1N outputs the electric signal obtained as a result of CDS to the column I/F unit 12 as a weighted addition result of the pixel value of the A pixel and the pixel value of the B pixel.

Figure 9:
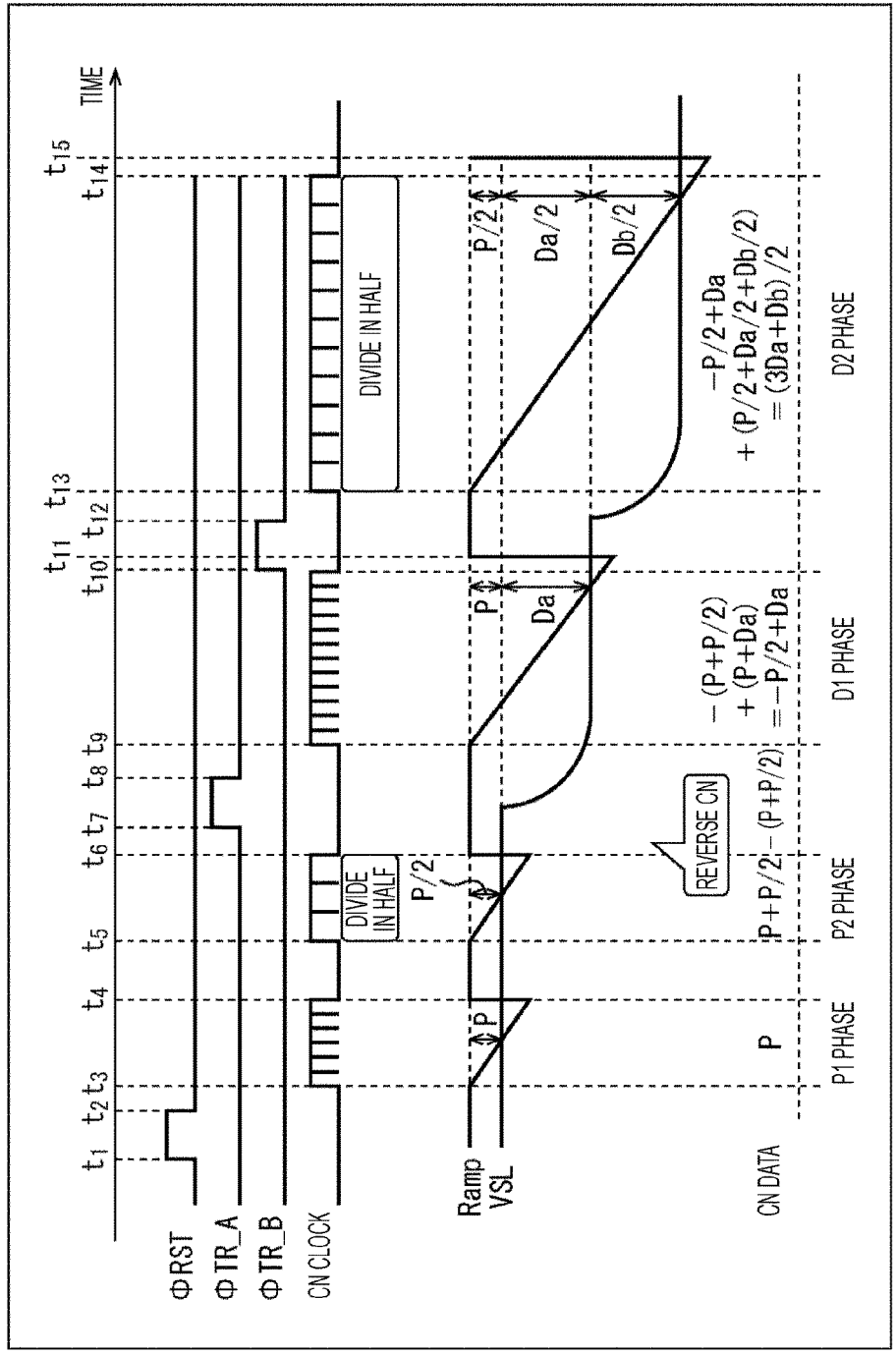
FIG. 9 is a diagram illustrating a timing chart of a reading operation of FIG. 8.

FIG. 9 is a diagram illustrating a timing chart of the above-described reading operation.

A ramp signal of FIG. 9 is a reference signal the DAC 51N generates and outputs to each ADC. VSL represents, for example, a signal line voltage of the VSL 0. In addition to the signal line voltage and the reference signal voltage, FIG. 9 illustrates the reset pulse RST, the transfer pulse TR_A, the transfer pulse TR_B, and the clock signal (CN clock).

The reset pulse RST is a signal to be supplied to the reset Tr 84A of the pixel unit 61$_{11}$ and the reset Tr 84B of the pixel unit 61$_{12}$. The transfer pulse TR_A and the transfer pulse TR_B are signals to be supplied to the transfer Tr 82-1A of the A pixel and the transfer Tr 82-1B of the B pixel, respectively. The clock signal is a signal that serves as a basis for the counting operation of the counter 73 of the ADC 53-1N.

In FIG. 9, the signal line voltage represents the voltage to be applied to the comparator 72 of the ADC 53-1N, instead of the voltage itself on the VSL 0. The reference signal voltage represents the voltage to be applied to the comparator 72.

Note that the signal line voltage to be approved by the comparator 72 is a voltage according to a horizontal weighted addition result. In addition, operations identical to the reading operations performed in the pixel unit 61$_{11}$ and the pixel unit 61$_{12}$ are performed with identical timing in the pixel unit 61$_{31}$ and the pixel unit 61$_{32}$ of the third column.

Therefore, although the following describes reading of the signals of the R pixel 41$_{(1, 1)}$ of the pixel unit 61$_{11}$, which is the A pixel, and the R pixel 41$_{(3, 1)}$ of the pixel unit 61$_{12}$, which is the B pixel, actually, the signal level of the A pixel represents the signal level of the weighted addition result of the R pixel 41$_{(1, 1)}$ of the pixel unit 61$_{11}$ and the R pixel 41$_{(1, 3)}$ of the pixel unit 61$_{31}$, whereas the signal level of the B pixel represents the signal level of the weighted addition result of the R pixel 41$_{(3, 1)}$ of the pixel unit 61$_{12}$ and the R pixel 41$_{(3, 3)}$ of the pixel unit 61$_{32}$.

During a period from time $t_1$ to time $t_2$, the row scanning unit 22 makes the reset pulse RST an H level. This causes the FD shared by the pixel unit 61$_{11}$ and the pixel unit 61$_{12}$ to be reset.

During a period from time $t_3$ to time $t_4$, the voltage of the reference signal becomes smaller at a constant rate, forming a slope. The slope of the reference signal during the period from time $t_3$ to time $t_4$ is a slope for performing the first A/D conversion of the reset level. This slope period is referred to as a preset (P) 1 phase. The comparator 72 compares the voltage of the reference signal with the signal line voltage of the VSL 0, and outputs a comparison result to the counter 73.

During the P1 phase period, the counter 73 of the ADC 53-1N starts counting of the clock from start time of the P1 phase $t_3$ in accordance with the clock signal of a predetermined frequency.

The counting operation during the P1 phase is continued until the reference signal and the signal line voltage agree with each other and a magnitude relationship of the reference signal and the signal line voltage is reversed. A counted value (CN data) during the P1 phase is a first A/D conversion result of the reset level. The first A/D conversion result of the reset level is represented by Equation (1) below.

[Mathematical Formula 1]

$$CN\ data = P \tag{1}$$

At time $t_4$ at which the P1 phase ends, the voltage of the reference signal rises to the voltage value identical to the voltage value when the slope has started.

During a period from time $t_5$ to time $t_6$, the voltage of the reference signal becomes smaller again at a constant rate, forming a slope. The slope of the reference signal during the period from time $t_5$ to time $t_6$ is a slope for performing the second A/D conversion of the reset level. This slope period is referred to as a P2 phase. The comparator 72 compares the voltage of the reference signal with the signal line voltage of the VSL 0, and outputs a comparison result to the counter 73.

During the P2 phase period, the counter 73 of the ADC 53-1N divides in half the clock signal used during the P1 phase in accordance with the control signal supplied from the division control unit 52N to generate the clock signal of a half frequency. The counter 73 starts counting of the clock from start time of the P2 phase $t_5$ in accordance with the clock signal obtained by performing division in half.

The counting operation during the P2 phase is continued until the reference signal and the signal line voltage agree with each other and a magnitude relationship of the reference signal and the signal line voltage is reversed. The counted value during the P2 phase is a second A/D conversion result of the reset level. The second A/D conversion result of the reset level is represented by Equation (2) below.

[Mathematical Formula 2]

$$CN \text{ data} = P + P/2 \qquad (2)$$

At time $t_6$ at which the P2 phase ends, the voltage of the reference signal rises. The counter 73 reverses the second A/D conversion result of the reset level.

During a period from time $t_7$ to time $t_8$, the row scanning unit 22 makes the transfer pulse TR_A an H level. This causes the transfer Tr 82-1A to be turned on, and the electric charge accumulated in the PD 81-1A of the A pixel is transferred to the FD after reset through the transfer Tr 82-1A.

Transfer of the electric charge from the PD 81-1A to the FD causes the signal line voltage corresponding to the electric charge accumulated in the FD to fall. When the transfer pulse TR_A becomes an L level at time $t_8$ and the transfer of the electric charge from the PD 81-1A to the FD is finished, the signal line voltage becomes a signal level corresponding to the electric charge accumulated in the FD.

During a period from time $t_9$, which is after time $t_8$, to time $t_{11}$, the voltage of the reference signal becomes smaller at a constant rate, forming a slope. The slope of the reference signal during the period from time $t_9$ to time $t_{11}$ is a slope for performing A/D conversion of the signal line voltage immediately after the electric charge is transferred from the PD 81-1A to the FD. This slope period is referred to as a data (D) 1 phase. The comparator 72 compares the voltage of the reference signal with the signal line voltage of the VSL 0, and outputs a comparison result to the counter 73.

During a period from time $t_9$ to time $t_{10}$, the counter 73 of the ADC 53-1N starts counting of the clock from start time $t_9$ of the D1 phase in accordance with the clock signal of the frequency identical to the frequency of the clock signal used during the P1 phase.

The counting operation during the D1 phase is continued until the reference signal and the signal line voltage agree with each other and a magnitude relationship of the reference signal and the signal line voltage is reversed. The counted value during the D1 phase is a first A/D conversion result of the signal level. The first A/D conversion result of the signal level is represented by Equation (3) below.

[Mathematical Formula 3]

$$CN \text{ data} = -(P + P/2) + (P + Da) = -P/2 + Da \qquad (3)$$

During a period from time $t_{10}$ to time $t_{12}$ after the first A/D conversion of the signal level is finished, the row scanning unit 22 makes the transfer pulse TR_B an H level. This causes the transfer Tr 82-1B to be turned on, and the electric charge accumulated in the PD 81-1B of the B pixel is transferred to the FD through the transfer Tr 82-1B. In the FD, the electric charge read from the B pixel is added to the electric charge read from the A pixel.

Transfer of the electric charge from the PD 81-1B to the FD causes the signal line voltage corresponding to the electric charge accumulated in the FD to fall. When the transfer pulse TR_B becomes an L level at time $t_{12}$ and the transfer of the electric charge from the PD 81-1B to the FD is finished, the signal line voltage becomes a signal level corresponding to the electric charge accumulated in the FD.

In addition, during a period from time $t_{13}$ to time $t_{15}$, the voltage of the reference signal becomes smaller at a constant rate, forming a slope. The slope of the reference signal during the period from time $t_{13}$ to time $t_{15}$ is a slope for performing A/D conversion of the signal line voltage immediately after the electric charge is transferred from the PD 81-1B to the FD. This slope period is referred to as a D2 phase. The comparator 72 compares the voltage of the reference signal with the signal line voltage of the VSL 0, and outputs a comparison result to the counter 73.

During a period from time $t_{13}$ to time $t_{14}$, the counter 73 of the ADC 53-1N divides in half the clock signal used during the D1 phase in accordance with the control signal supplied from the division control unit 52N to generate the clock signal of a half frequency. The clock signal generated is a clock signal of the frequency identical to the frequency of the clock signal used during the P2 phase. The counter 73 starts counting of the clock from start time $t_{13}$ of the D2 phase in accordance with the clock signal obtained by performing division in half.

The counting operation during the D2 phase is continued until the reference signal and the signal line voltage agree with each other and a magnitude relationship of the reference signal and the signal line voltage is reversed. The counted value during the D2 phase is a second A/D conversion result of the signal level. The second A/D conversion result of the signal level is represented by Equation (4) below.

[Mathematical Formula 4]

$$CN \text{ data} = -P/2 + Da + (P/2 + Da/2 + Db/2) = (3Da + Db)/2 \qquad (4)$$

The counter 73 outputs the second A/D conversion result of the signal level determined during the D2 phase as a weighted addition result of the pixel value of the A pixel and the pixel value of the B pixel.

As indicated in Equation (4), the second A/D conversion result of the signal level is a value obtained by performing weighted addition of a pixel value Da of the A pixel and a pixel value Db of the B pixel by 3:1. That is, output obtained by performing weighted addition of the signals of the two pixels by a ratio of 3:1 can be obtained by performing A/D conversion of the signal level after the transfer pulse TR_B by using the clock signal of the frequency of half of the clock frequency used when A/D conversion of the signal level after the transfer pulse TR_A is performed.

Weighted addition reading of the Gb pixel $41_{(2, 1)}$ of the pixel unit $61_{11}$ and the Gb pixel $41_{(4, 1)}$ of the pixel unit $61_{12}$ is performed similarly. A/D conversion of the electric signals from the Gb pixel $41_{(2, 1)}$ and the Gb pixel $41_{(4, 1)}$ is performed by the ADC 53-1S of the column processing unit 23S connected to the VSL 1. Note that reading of the Gb pixel $41_{(2, 1)}$ and the Gb pixel $41_{(4, 1)}$ is performed with different timing from reading of the R pixel $41_{(1, 1)}$ and the R pixel $41_{(3, 1)}$.

Thus, the image sensor 2 can implement vertical weighted addition in digital value by transferring the electric charge from each of the two pixels to be added to the FD by using transfer pulses twice during one reset period and further switching the counting operation and performing A/D conversion on output of each pixel.

In addition, the image sensor 2 can implement horizontal weighted addition by adding the signal line voltages of the VSL used for vertical weighted addition by using the capacitances provided on an input side of the comparator 72.

That is, the image sensor 2 can perform each of the vertical weighted addition and the horizontal weighted addition before outputting data to the column I/F unit 12.

<6. About Other Reading Operations>

In the pixel unit 61 that has the circuit configuration of FIG. 7, it is also possible to implement reading operations without performing vertical weighted addition.

Figure 10:
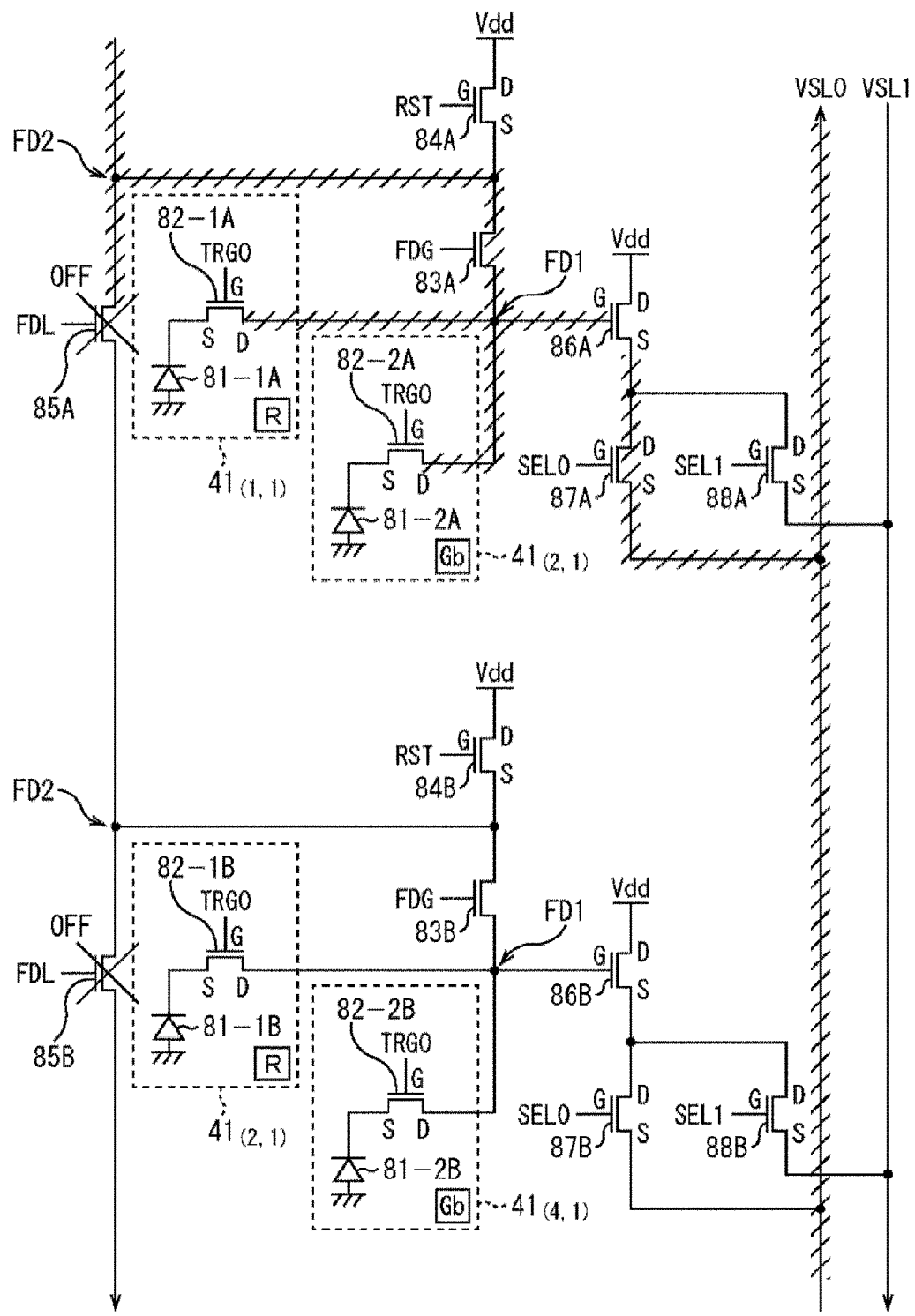
FIG. 10 is a diagram illustrating an electric signal flow in a reading operation without performing vertical weighted addition.

FIG. 10 is a diagram illustrating an electric signal flow in a reading operation without performing vertical weighted addition.

In this case, as illustrated in FIG. 10, both of the FD sharing Tr 85A of the pixel unit $61_{11}$ and the FD sharing Tr 85B of the pixel unit $61_{12}$ are in an off state, and the FD is not shared.

For example, when the transfer Tr 82-1A is turned on by the transfer pulse TRG 0, the electric charge read from the R pixel $41_{(1, 1)}$ is transferred to and accumulated in the FD. The signal line voltage of the VSL 0 is varied with the electric charge accumulated in the FD. With this arrangement, A/D conversion of the signal level of the R pixel $41_{(1, 1)}$ pixel is performed. Slanted lines illustrated on each line of FIG. 10 represent an image of the above-described reading of the electric signals.

Figure 11:
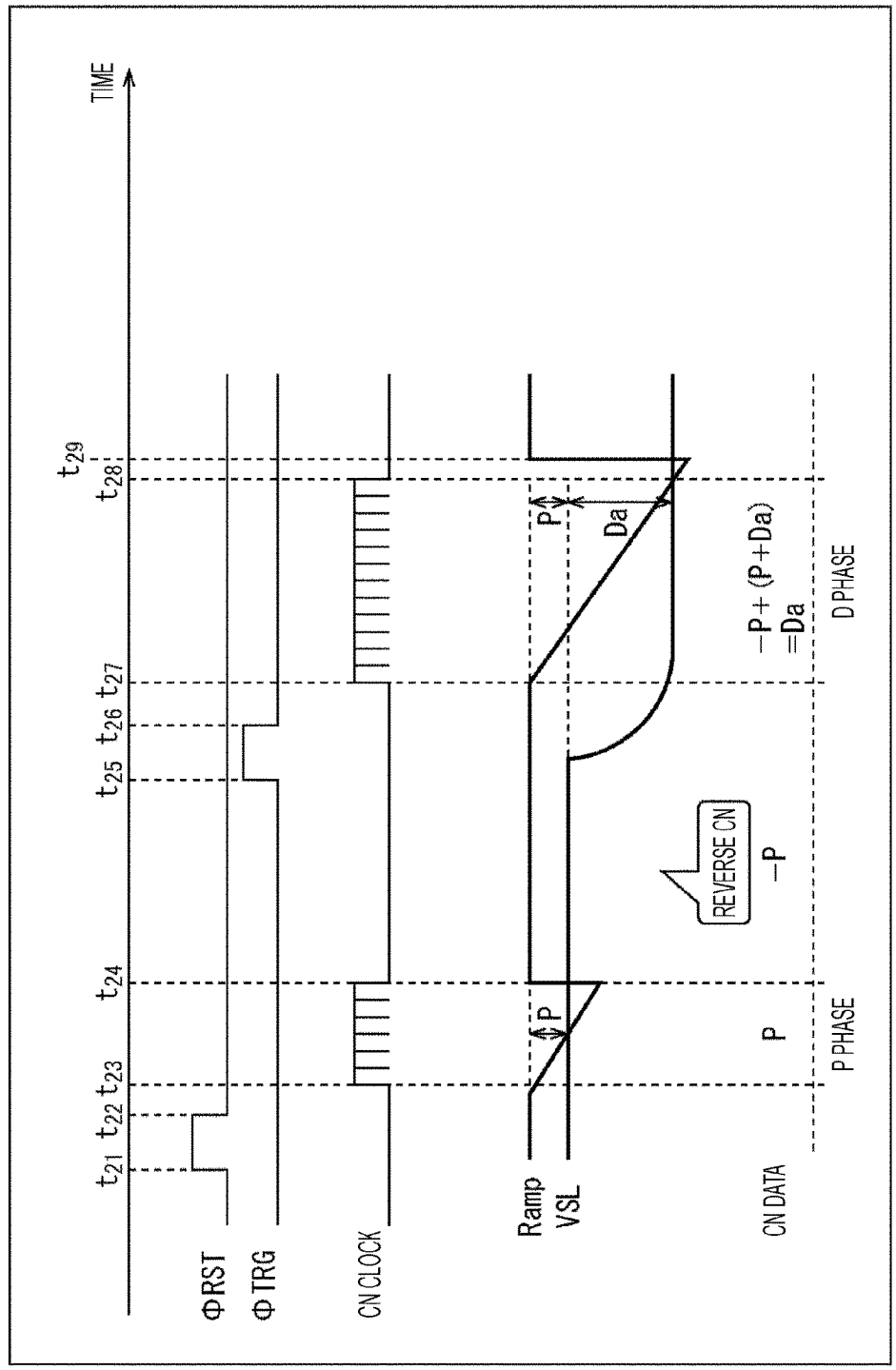
FIG. 11 is a diagram illustrating a timing chart of the reading operation of FIG. 10.

FIG. 11 is a diagram illustrating a timing chart of the reading operation of FIG. 10.

During a period from time $t_{21}$ to time $t_{22}$, the row scanning unit 22 makes the reset pulse RST an H level. This causes the FD of the pixel unit $61_{11}$ to be reset.

During a P phase period from time $t_{23}$ to time $t_{24}$, the counter 73 of the ADC 53-1N starts counting of the clock from start time of the P phase $t_{23}$ in accordance with the clock signal of a predetermined frequency. A counted value in the P phase is an A/D conversion result of the reset level. The A/D conversion result of the reset level is reversed.

During a period from time $t_{25}$ to time $t_{26}$, the row scanning unit 22 makes the transfer pulse TRG 0 an H level. This causes the transfer Tr 82-1A to be turned on, and the electric charge accumulated in the PD 81-1A of the R pixel $41_{(1, 1)}$ is transferred to the FD after reset through the transfer Tr 82-1A.

During a period from time $t_{27}$ to time $t_{28}$, the counter 73 of the ADC 53-1N starts counting of the clock from start time of the D phase $t_{27}$ in accordance with the clock signal of the frequency identical to the frequency of the clock signal used during the P phase.

A counted value by the counter 73 in the D phase is an A/D conversion result of the signal level. The counter 73 outputs the A/D conversion result of the signal level as a pixel value of the R pixel $41_{(1, 1)}$.

<7. About Effects>

By reading the two pixels that share the FD as described with reference to FIGS. 7 to 9, a reading speed can be improved compared with a case where the two pixels are read twice as illustrated in FIGS. 10 and 11.

That is, since the two pixels can be read using one reset pulse, it becomes possible to reduce time needed for reading the two pixels by time of one reset pulse, compared with a case where the two pixels are read using two reset pulses.

In addition, since the FD is shared between the two pixel units and capacitance of the FD doubles, a variation range of the signal line voltage becomes half compared with a case of reading illustrated in FIGS. 10 and 11. Since the variation range of the signal line voltage becomes half, time needed for the counting operation (time of the D1 phase and the D2 phase) can be reduced, and it also becomes possible to reduce time needed for reading the two pixels by the reduced time needed for the counting operation.

Furthermore, reading of the two pixels described with reference to FIGS. 7 to 9 makes it possible to supply the electric signals of the two pixels to the ADC through one VSL. This makes it possible, in a case where one column is provided with two VSLs, to perform north and south simultaneous reading as described above, which enables improvement in the reading speed without increasing the number of VSLs.

Since time needed for implementing the same frame rate can be reduced, it becomes possible to reduce power consumption.

Since horizontal weighted addition can be performed before output to the column I/F unit 12, power consumption can be reduced when compared with a case where horizontal weighted addition is performed using a digital value in the signal processing unit 13 or the like in a downstream stage. In addition, a set can be made smaller.

<8. Variations>

In FIG. 3, horizontal weighted addition is performed in the capacitances on an input side of the comparator 72; however, horizontal weighted addition may not be performed.

In addition, a connection relationship of the VSLs and the capacitances is fixed, for example, the VSL 0 of the first column is connected to the capacitance 71-1 and the VSL 0 of the third column is connected to the capacitance 71-2; however, it is also possible to have a configuration in which the VSL to be connected to each capacitance can be selected with a switch.

Figure 12:
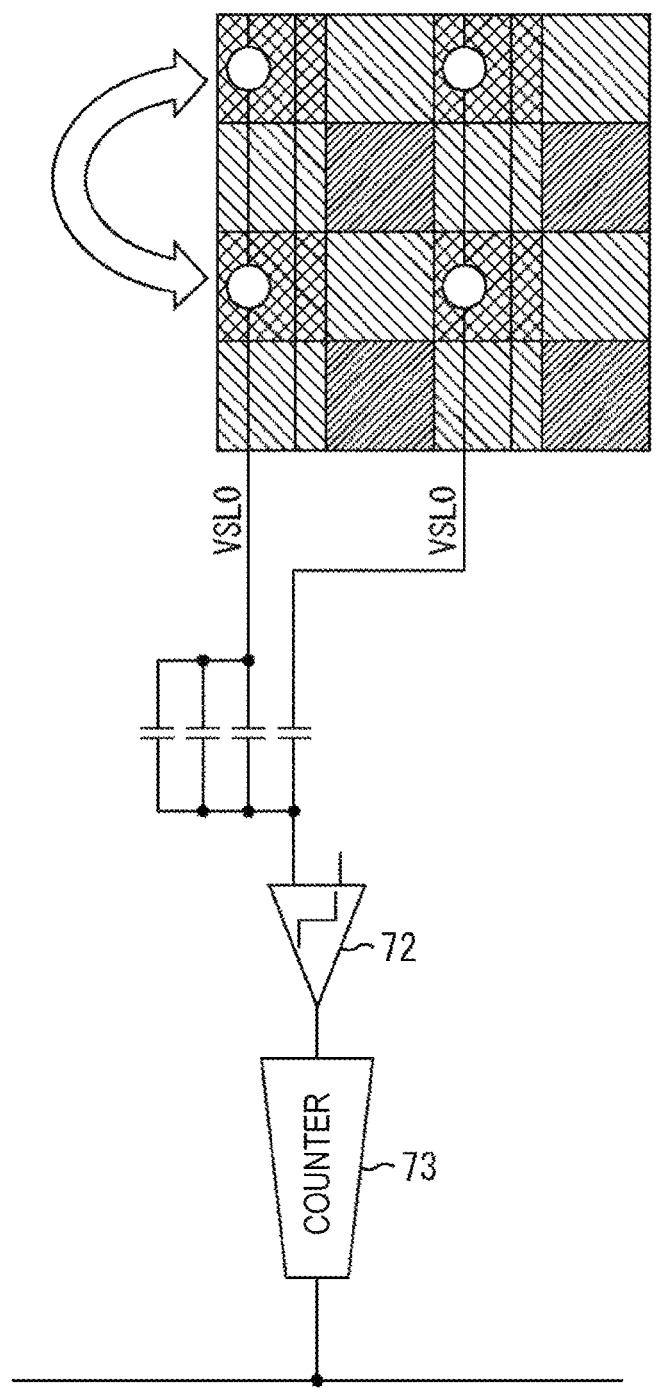
FIG. 12 is a diagram illustrating another exemplary configuration of ADC.

Furthermore, as illustrated in FIG. 12, application to various kinds of weighted addition is possible through setting, to an arbitrary ratio, a capacitance ratio of the respective capacitances provided with one pixel signal and the other pixel signal that are to undergo horizontal weighted addition.

In the above description, the first A/D conversion of the signal level is performed in accordance with the clock signal of a predetermined frequency, and the second A/D conversion is performed in accordance with the clock signal of half of the frequency; however, a division ratio of the frequency of the clock signal that serves as a basis for the counting operation may be any ratio.

In addition, in the above description, the number of ADCs which is half of the number of pixel columns is provided in each of the column processing unit 23N and the column processing unit 23S; however, one ADC may be provided in each column.

Figure 13:
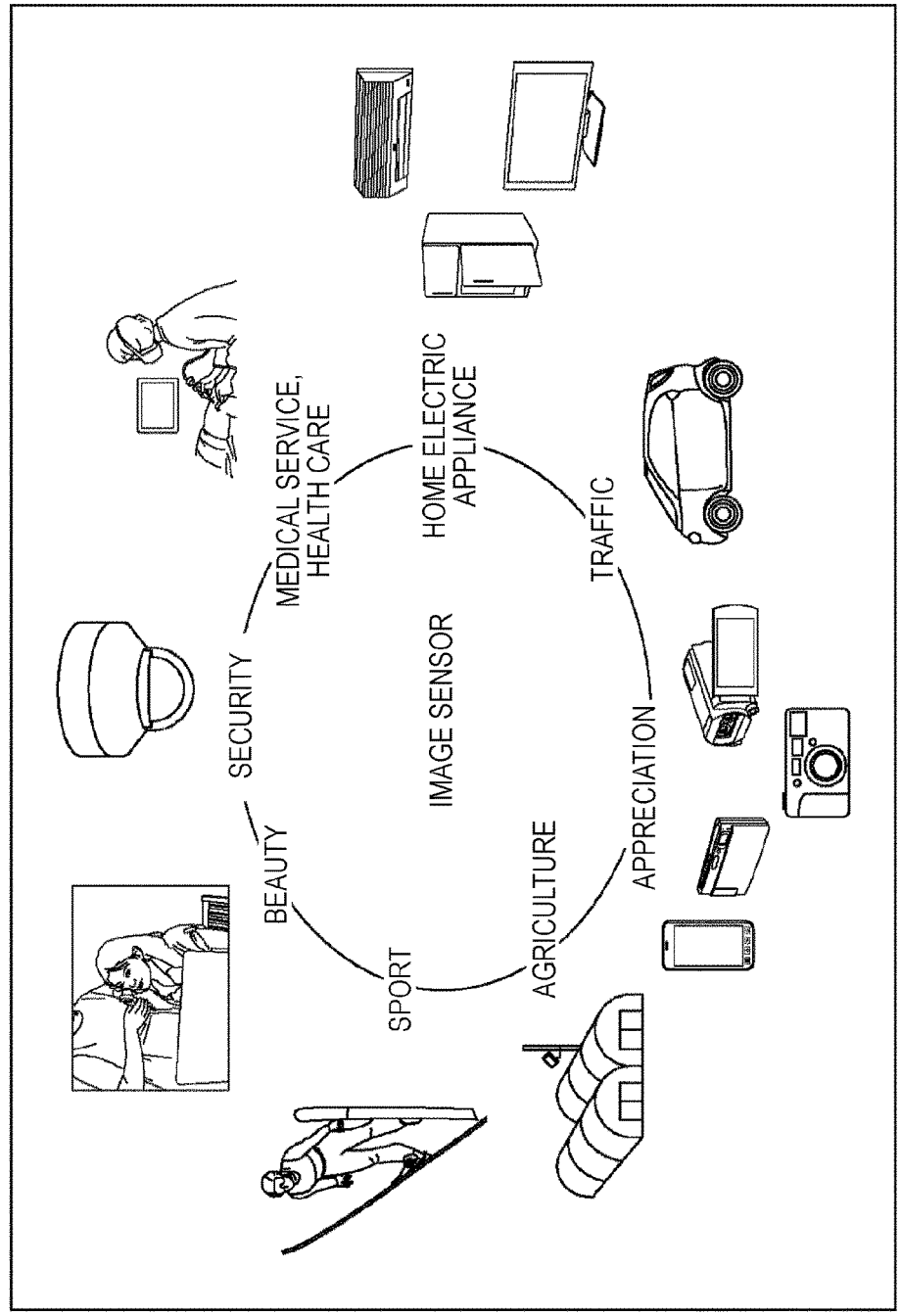
FIG. 13 is a diagram illustrating exemplary use of electronic devices.

FIG. 13 is a diagram illustrating an exemplary use of the above-described image sensor 2 (image pickup device) and electronic devices including the image pickup device.

The above-described image pickup device can be used, for example, in various cases of sensing light, such as visible light, infrared light, ultraviolet light, and X-ray, as follows.

Apparatus that captures images to be provided for use of appreciation, such as a digital camera and a portable device with a camera function.

Apparatus to be provided for use of traffic for driving safety including automatic stop, recognition of driver's conditions, and the like, such as a vehicle-mounted sensor that captures images of front, back, surroundings, inside, and the like of an automobile, a surveillance camera that monitors traveling vehicles and roads, and a distance measuring sensor that measures a distance between vehicles and the like.

Apparatus to be provided for home electric appliances, such as a TV, a refrigerator, and an air conditioner, for capturing user's gesture and operating the appliance in response to the gesture.

Apparatus to be provided for use of medical services and health care, such as an endoscope and an apparatus that captures images of a blood vessel by receiving infrared light.

Apparatus to be provided for use of security, such as a surveillance camera for crime prevention applications and a camera for person authentication applications.

Apparatus to be provided for use of beauty, such as a skin measuring device that captures skin images and a microscope that captures scalp images.

Apparatus to be provided for use of sport, such as an action camera and a wearable camera for sporting applications and the like.

Apparatus to be provided for use of agriculture, such as a camera for monitoring a state of fields and farm products.

Embodiments of the present technology are not limited to the above-described embodiment, and various changes can be made without departing from the spirit of the present technology.

The present technology may also have the following configurations.

(1)

An image sensor including:

a pixel array unit in which same-color pixels that share FD are connected to an identical first vertical signal line;

a reading control unit configured to control reading of an electric charge from a plurality of pixels that shares the FD so as to transfer, after resetting the FD, to the FD an electric charge of a first pixel of the pixels that share the FD, and after transferring the electric charge of the first pixel to the FD, to transfer an electric charge of a second pixel to the FD; and a first A/D converter connected to the first vertical signal line, the first A/D converter being configured to perform A/D conversion of a signal level of the first pixel in accordance with a clock signal of a first frequency, and to perform A/D conversion of a signal level of the second pixel in accordance with a clock signal of a second frequency obtained by dividing the first frequency by a predetermined division ratio.

(2)

The image sensor according to (1), in which before the electric charge is transferred from the first pixel, the first A/D converter performs A/D conversion of a reset level to be used for CDS in accordance with the clock signal of the first frequency and in accordance with the clock signal of the second frequency.

(3)

The image sensor according to (1) or (2), in which the pixel array unit includes a third pixel of predetermined color different from color of the first pixel, the third pixel being adjacent to the first pixel, and a fourth pixel of the predetermined color, the fourth pixel being adjacent to the second pixel, and the third pixel and the fourth pixel that share the FD are connected to a second vertical signal line provided in a first column identical to the first vertical signal line to which the first pixel and the second pixel are connected.

(4)

The image sensor according to (3), in which after resetting the FD, the reading control unit transfers an electric charge of the third pixel to the FD, and after transferring the electric charge of the third pixel to the FD, the reading control unit transfers an electric charge of the fourth pixel to the FD, and the image sensor further includes a second A/D converter connected to the second vertical signal line, the second A/D converter being configured to perform A/D conversion of a signal level of the third pixel in accordance with the clock signal of the first frequency, and to perform. A/D conversion of a signal level of the fourth pixel in accordance with the clock signal of the second frequency.

(5)

The image sensor according to (4), in which the first A/D converter and the second A/D converter are provided at a first position and a second position that sandwich the pixel array unit, respectively.

(6)

The image sensor according to any of (1) to (5), in which a plurality of capacitances including a first capacitance and a second capacitance are provided on an input side of the first A/D converter, the first capacitance accumulating an electric charge corresponding to electric signals read from the first pixel and the second pixel, the electric signals being supplied through the first vertical signal line, the second capacitance accumulating an electric charge corresponding to electric signals read from the first pixel and the second pixel of a second column, the electric signals being supplied through the first vertical signal line of the second column, and the first A/D converter performs A/D conversion of signals that are input through the capacitances.

(7)

A method of reading control of pixel signals, the method including the steps of:

after resetting FD provided in a pixel array unit in which same-color pixels that share the FD are connected to an identical first vertical signal line, transferring, to the FD, an electric charge of a first pixel of the plurality of pixels that share the FD;

after transferring the electric charge of the first pixel to the FD, transferring an electric charge of a second pixel to the FD;

performing, by a first A/D converter connected to the first vertical signal line, A/D conversion of a signal level of the first pixel in accordance with a clock signal of a first frequency; and performing, by the first A/D converter, A/D conversion of a signal level of the second pixel in accordance with a clock signal of a second frequency obtained by dividing the first frequency by a predetermined division ratio.

(8)

An electronic device including:

an optical unit including a lens;

an image sensor configured to receive light incident through the optical unit, the image sensor including:

a pixel array unit in which same-color pixels that share FD are connected to an identical first vertical signal line;

a reading control unit configured to control reading of an electric charge from a plurality of pixels that shares the FD so as to transfer, after resetting the FD, to the FD an electric charge of a first pixel of the pixels that share the FD, and after transferring the electric charge of the first pixel to the FD, to transfer an electric charge of a second pixel to the FD; and a first A/D converter connected to the first vertical signal line, the first A/D converter being configured to perform A/D conversion of a signal level of the first pixel in accordance with a clock signal of a first frequency, and to perform A/D conversion of a signal level of the second pixel in accordance with a clock signal of a second frequency obtained by dividing the first frequency by a predetermined division ratio; and a signal processing unit configured to process pixel data that is output from the image sensor.

REFERENCE SIGNS LIST

2 Image sensor
21 Pixel array unit
22 Row scanning unit
23N, 23S Column processing unit
24N, 24S Column scanning unit
41 Pixel
51N, 51S DAC
52N, 52S Division control unit
53-1N, 53-2N, 53-1S, 53-2S ADC

What is claimed is:

1. An image sensor comprising:
a pixel array unit in which same-color pixels that share a floating diffusion are connected to an identical first vertical signal line;
a reading control unit comprising a transistor configured to control reading of an electric charge from a plurality of pixels that share the floating diffusion so as to transfer, after resetting the floating diffusion, to the floating diffusion an electric charge of a first pixel of the pixels that share the floating diffusion, and after transferring the electric charge of the first pixel to the floating diffusion, to transfer an electric charge of a second pixel to the floating diffusion; and
a first A/D converter connected to the first vertical signal line, the first A/D converter being configured to perform A/D conversion of a signal level of the first pixel in accordance with a clock signal of a first frequency, and to perform A/D conversion of a signal level of the second pixel in accordance with a clock signal of a second frequency obtained by dividing the first frequency by a predetermined division ratio, wherein before the electric charge is transferred from the first pixel, the first A/D converter performs A/D conversion of a reset level to be used for correlated double sampling.

2. The image sensor according to claim 1, wherein correlated double sampling is in accordance with the clock signal of the first frequency and in accordance with the clock signal of the second frequency.

3. The image sensor according to claim 1, wherein
the pixel array unit includes a third pixel of a predetermined color different from a color of the first pixel, the third pixel being adjacent to the first pixel, and a fourth pixel of the predetermined color, the fourth pixel being adjacent to the second pixel, and
the third pixel and the fourth pixel that share the floating diffusion are connected to a second vertical signal line provided in a first column identical to the first vertical signal line to which the first pixel and the second pixel are connected.

4. The image sensor according to claim 3, wherein
after resetting the floating diffusion, the reading control unit transfers an electric charge of the third pixel to the floating diffusion, and after transferring the electric charge of the third pixel to the floating diffusion, the reading control unit transfers an electric charge of the fourth pixel to the floating diffusion, and the image sensor further comprises a second A/D converter connected to the second vertical signal line, the second A/D converter being configured to perform A/D conversion of a signal level of the third pixel in accordance with the clock signal of the first frequency, and to perform A/D conversion of a signal level of the fourth pixel in accordance with the clock signal of the second frequency.

5. The image sensor according to claim 4, wherein the first A/D converter and the second A/D converter are provided at a first position and a second position that sandwich the pixel array unit, respectively.

6. The image sensor according to claim 1, wherein
a plurality of capacitances including a first capacitance and a second capacitance are provided on an input side of the first A/D converter, the first capacitance accumulating an electric charge corresponding to electric signals read from the first pixel and the second pixel, the electric signals being supplied through the first vertical signal line, the second capacitance accumulating an electric charge corresponding to electric signals read from the first pixel and the second pixel of a second column, the electric signals being supplied through the first vertical signal line of the second column, and
the first A/D converter performs A/D conversion of signals that are input through the capacitances.

7. A method of reading control of pixel signals, the method comprising the steps of:
performing, by a first A/D converter, A/D conversion of a reset level to be used for correlated double sampling;
after resetting a floating diffusion provided in a pixel array unit in which same-color pixels that share the floating diffusion are connected to an identical first vertical signal line, transferring, to the floating diffusion, an electric charge of a first pixel of the plurality of pixels that share the floating diffusion;
after transferring the electric charge of the first pixel to the floating diffusion, transferring an electric charge of a second pixel to the floating diffusion;
performing, by the first A/D converter, A/D conversion of a signal level of the first pixel in accordance with a clock signal of a first frequency, wherein the first A/D converter is connected to the first vertical signal line; and
performing, by the first A/D converter, A/D conversion of a signal level of the second pixel in accordance with a clock signal of a second frequency obtained by dividing the first frequency by a predetermined division ratio.

8. An electronic device comprising:
an optical unit including a lens;
an image sensor configured to receive light incident through the optical unit, the image sensor comprising:
a pixel array unit in which same-color pixels that share a floating diffusion are connected to an identical first vertical signal line;
a reading control unit comprising a transistor configured to control reading of an electric charge from a plurality of pixels that share the floating diffusion so as to transfer, after resetting the floating diffusion, to the floating diffusion an electric charge of a first pixel of the pixels that share the floating diffusion, and after transferring the electric charge of the first pixel to the floating diffusion, to transfer an electric charge of a second pixel to the floating diffusion; and
a first A/D converter connected to the first vertical signal line, the first A/D converter being configured to perform A/D conversion of a signal level of the first pixel in accordance with a clock signal of a first frequency, and to perform A/D conversion of a signal level of the second pixel in accordance with a clock signal of a second frequency obtained by dividing the first frequency by a predetermined division ratio, wherein before the electric charge is transferred from the first pixel, the first A/D converter performs A/D conversion of a reset level to be used for correlated double sampling; and a signal processing unit configured to process pixel data that is output from the image sensor.

* * * * *